United States Patent [19]

Tang et al.

[11] Patent Number: 6,134,500
[45] Date of Patent: Oct. 17, 2000

[54] SYSTEM AND METHOD FOR GENERATING OPTIMAL FLIGHT PLANS FOR AIRLINE OPERATIONS CONTROL

[75] Inventors: Baoxing Tang, Roselle; Amit Mukherjee, Rolling Meadows, both of Ill.

[73] Assignee: United Air Lines, Inc., Elk Grove Township, Ill.

[21] Appl. No.: 09/324,687

[22] Filed: Jun. 3, 1999

[51] Int. Cl.[7] ..................................... G06F 15/00
[52] U.S. Cl. .................. 701/202; 701/3; 701/10; 701/203; 701/205; 244/158 R; 73/178 R
[58] Field of Search .................. 701/3–5, 7, 10, 701/11, 200, 201, 202, 203, 205; 342/26, 34; 244/158 R; 73/178 R

[56] References Cited

U.S. PATENT DOCUMENTS

| | | | |
|---|---|---|---|
| 4,413,316 | 11/1983 | Blue et al. | 364/200 |
| 4,642,775 | 2/1987 | Cline et al. | 364/443 |
| 4,812,990 | 3/1989 | Adams et al. | 364/444 |
| 5,047,946 | 9/1991 | King et al. | 364/448 |
| 5,343,388 | 8/1994 | Wedelin | 364/402 |
| 5,398,186 | 3/1995 | Nakhla | 364/428 |
| 5,526,265 | 6/1996 | Nakhla | 364/428 |

OTHER PUBLICATIONS

Sorensen and Goka, "Design of an Advanced Flight Planning System," Analytical Mechanics Associates, Inc., pp. 663–668.

"767 Fuel Conservation", Boeing Airliner Magazine, Fuel Conservation & Operations Newsletter No. 14, Apr.–Jun. 1984.

"757 Fuel Conservation", Boeing Airliner Magazine, Fuel Conservation & Operations Newsletter No. 15, Jul.–Sep. 1984.

"737–500 Fuel Conservation", Boeing Airliner Magazine, Fuel Conservation & Operations Newsletter No. 40, Oct.–Dec. 1990.

Heinz Erzberger and Homer Lee, "Constrained Optimum Trajectories with Specified Range", AIAA J. Guidance and Control, vol. 3, No. 1, Article No. 80–4004, pp. 78–85.

James T. McKenna, "New Flight Planner Mimics High–End Tool", Aviation Week & Space Technology, vol. 145, Nov. 25, 1996, pp. 59 & 62.

(List continued on next page.)

*Primary Examiner*—William A. Cuchlinski, Jr.
*Assistant Examiner*—Yonel Beaulieu
*Attorney, Agent, or Firm*—Brinks Hofer Gilson & Lione

[57] ABSTRACT

A system and method for generating a minimum-cost airline flight plan from a point of origin through a set of fix points to a destination point. A set of navigation airways from the point of origin to the destination point, including predefined fix points and vectors for high altitude flight, and a set of predetermined flight planning altitudes is stored in a database. Operational data for the flight and weather data for the flight is also stored in the database, as well as station data, station approach and departure procedures, predefined flight restricted areas, and flight performance data. The predefined fix points are transformed from the Cartesian plane onto a new coordinate system based on the great circle route between the origin and the destination. Each transformed fix point is assigned an ordinal value, and an acyclic network is constructed based on the ordinal values and within a feasible search region which excludes any flight restricted areas. Using dynamic programming techniques and shortest path optimization, a minimum cost flight path from the point of origin through a plurality of predefined navigation fix points to a destination point is calculated. The minimum cost flight path calculations take into account weather data for predetermined flight planning altitudes, aircraft weight and payload data, and performance data. The system comprises a general purpose computer having a memory, a database stored in the memory, and a means executing within the general purpose computer for determining the minimum cost flight path from a point of origin through a set of predefined navigation fix points to a destination point.

36 Claims, 7 Drawing Sheets

OTHER PUBLICATIONS

N. V. Pavlova, V. V. Petrov, and E. I. Kholyavko, "Computer–Aided Flight Planning by Means of Artificial Intelligence", Automation and Remote Control, vol. 58, No. 6, 1997, pp. 1017–1025.

John A. Sorensen and Mark H. Waters, "Airborne Method to Minimize Fuel with Fixed Time–of–Arrival Constraints" AIAA J. Guidance and Control, vol. 4, No. 3, Article No. 81–4128, pp. 348–349.

John. A. Sorensen, "The Flight Planning—Flight Management Connection", American Control Conference, San Diego, CA, Jun. 1984, pp. 174–178.

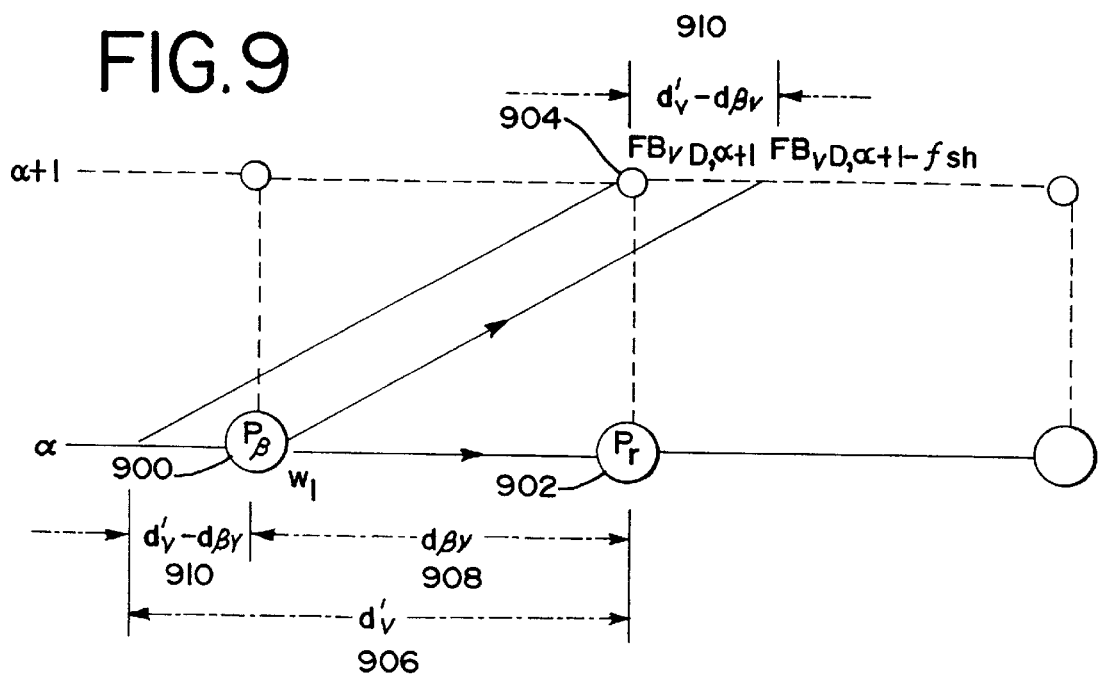
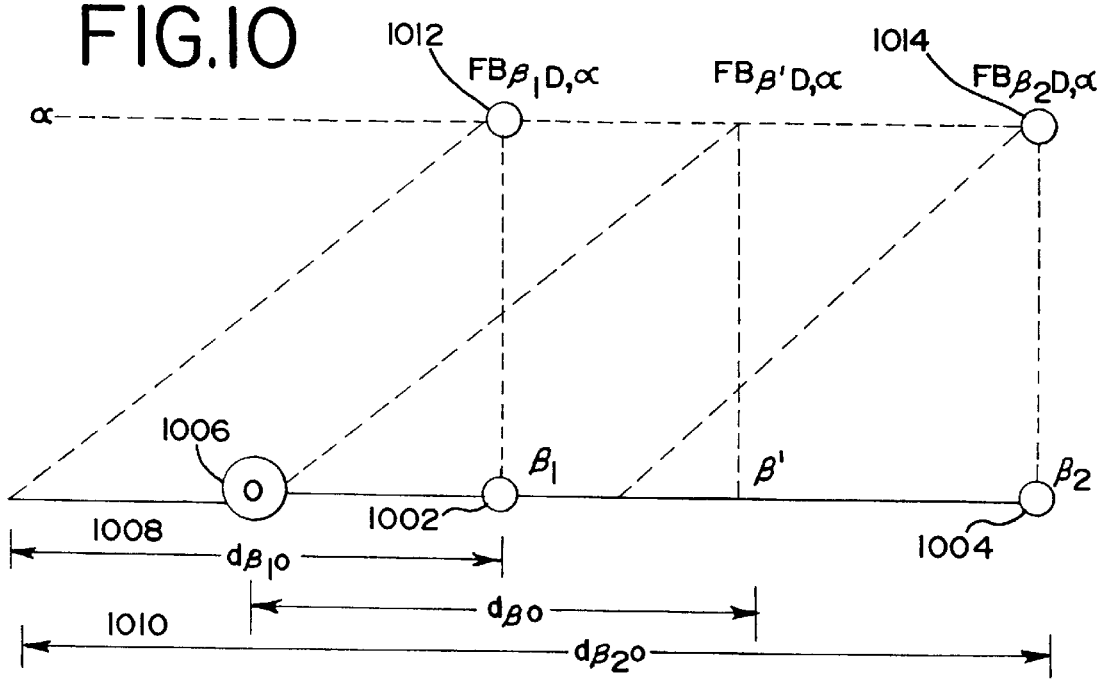

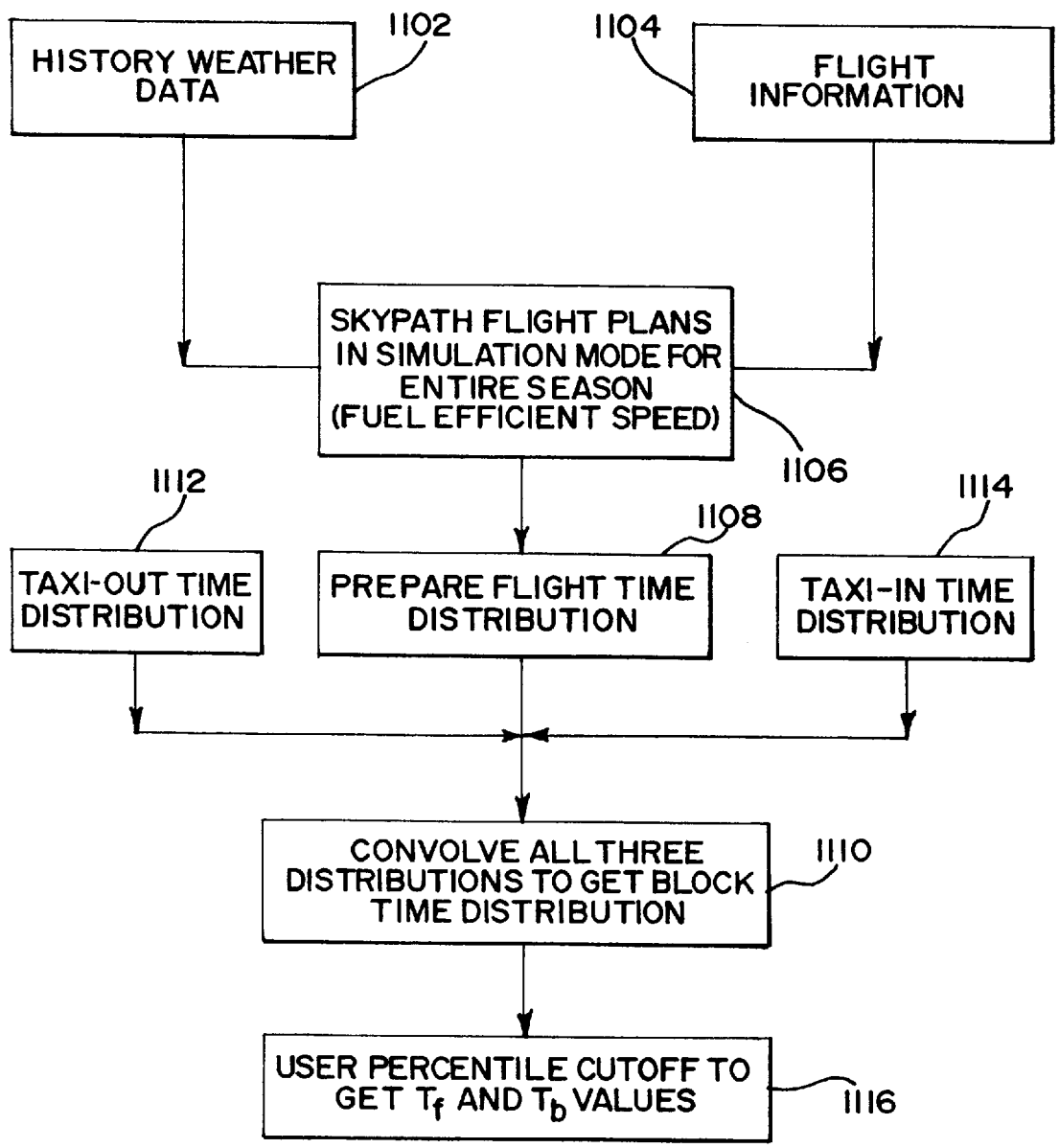

SYSTEM AND METHOD FOR GENERATING OPTIMAL FLIGHT PLANS FOR AIRLINE OPERATIONS CONTROL

MICROFICHE/COPYRIGHT REFERENCE

A Microfiche Appendix is included in this application (2621 frames, 27 sheets) that contains material which is subject to copyright protection. The copyright owner has no objection to the facsimile reproduction by anyone of the Microfiche Appendix, as it appears in the U.S. Patent and Trademark Office patent files or records, but otherwise reserves all copyright rights whatsoever.

BACKGROUND OF THE INVENTION

Whenever there is a flight flown between an origin and a destination, each leg of the flight requires the generation and filing of a flight plan. A flight plan is a document that lays out the ground route between the take-off and landing, the altitude levels to be flown and the speed schedule of the aircraft throughout the flight. The flight plan is used to compute the fuel required for the flight as well as the flight time.

Flight planning depends on a number of different factors. It is influenced by the upper air weather conditions such as winds, temperature and thunderstorm conditions. Another important factor affecting the flight planning process includes the aircraft performance with regard to the speeds allowable and the fuel efficiency of the aircraft under different altitude and speed conditions. Flight planning depends significantly on navigation data. Aircraft are typically constrained to fly along well defined airways and fixes, where fixes correspond to the nodes and the airways correspond to the arcs of a network.

The FAA (Federal Aviation Administration) also imposes restrictions on how to enter and exit airports as well as on the altitudes that can be flown by the aircraft. Over the domestic United States, aircraft are required to fly from east to west at certain altitudes and west to east at certain other altitudes. The revenue requirements of a flight also imposes payload constraints on the aircraft which determines the altitudes that can be flown by the aircraft.

The volume of flights handled daily by major airlines requires that the flight plan computation be very fast, to the order of 2 seconds for any domestic flight. This is a productivity constraint on the flight planning problem.

Flight planning is a mission critical process that starts with the estimation of the passenger and cargo payload for a flight. Flight plans are commonly generated by dispatchers two hours before the flight departure, and the proposed ground route for the flight is electronically sent to the FAA computer for approval. Approved flight plans are sent to the aircraft crew who review the plan and fuel the aircraft accordingly. If the conditions change for any reason, dispatchers have to generate new flight plans by performing a "what-if" analysis on the original flight plan.

Flight planning is at the heart of any real-time operations control to an airline. It is the primary activity that determines the airline operations and all other operational issues, such as irregular operations, flight cancellations, maintenance routing and gate planning, and ties in as peripheral activities to the flight planning process. Flight times are determined by flight planning, and the setting of airline schedules for the future is dependent on the distribution of flight times. Therefore, flight planning plays a key role in determining aircraft usage and designing the airline schedule timings for any leg of a flight. From a cost point of view, airline fuel costs can be as large as $1 billion per year at major airlines. Time costs related to missed connections and passenger goodwill lost due to late operations can be an even greater number in large airlines. Therefore, any savings in fuel and time can have a significant impact on the costs of running an airline.

The current flight planning methodology in operation for commercial airlines is a two step process. Each pair of departure and arrival cities has a set of a limited number of fixed routes. The first step is to roughly estimate the ground route from the fixed set of routes between any two departure and arrival points. This rough estimation is based upon choosing the fastest route by assigning approximate weather conditions along the route. For example, the initial portion of the route may consider lower altitude weather while later portions may consider higher altitudes for weather conditions. If there is a thunderstorm, the dispatcher has to visually see which routes avoid the thunderstorm and select the route that is most appropriate. The second step in current flight planning uses the rough estimate of the ground route to develop the altitude and speed schedule. The flight profiles for each altitude and mach number are developed to determine the best combination of altitudes and mach numbers that provides the lowest fuel and time costs. FIG. 1, discussed below, illustrates the steps involved in the existing conventional flight planning process.

The above approach to flight planning has a number of weaknesses and provides poor solutions to the problem of generating an optimal flight plan. The structure of the flight planning network which is composed of airways and fixes provides for literally millions of possible combinations in designing routes, and storing a set of a limited number of fixed routes is highly suboptimal. The wind patterns, which may vary widely on any given day, determine the best route and the set of fixed routes required to be used may comprise a very poor set of choices on a specific day. Furthermore, subdividing the process into separate steps of route selection followed by altitude and speed selection is also suboptimal because the route selection, altitude selection and speed selection are a tightly coupled phenomenon. Any decomposition of the process into route selection and then altitude and selection is fundamentally flawed and suboptimal. If a route is selected based upon approximate weather conditions at different altitudes, the actual flight profile may follow different altitudes due to payload and performance requirements of the aircraft. Therefore, the proposed flight plan may not turn out to be very good if compared with the initial assumption. The above methodology becomes worse if a thunderstorm is predicted. The dispatcher must visually select the routes that avoid a thunderstorm. This also leads to a poor selection of routes.

The FAA wants to reduce some of the navigation constraints by allowing direct links between fixes that are less than 260 nautical miles apart as part of the National Route Program. The use of such closely spaced fixes will increase the density of the National Route Program network. In a network of such increased density, a set of fixed routes is a very poor way to select the best flight plan.

The typical approach to flight plan optimization has been to consider it as a trajectory optimization problem from the physics of the aircraft motion. The problem is formulated as a continuous non-linear optimization problem. Such a formulation is solved using iterative search or calculus of variations to obtain a solution to the flight trajectory. This kind of formulation has some serious drawbacks. First of all, a four dimensional optimization over all altitudes, navigation locations and speed results in a very complex formulation. In addition, some of the important issues, such as the use of FAA defined altitudes, step climbs, climb of the aircraft, descent of the aircraft, and entry and exit to the airport, cannot be incorporated into one global optimization equation. Secondly, the iterative search or calculus of variations approach requires a high computation time and is therefore impractical for use in real time airline flight operations. One prior art reference entitled "Constrained Optimum Trajectories with Specified Range," explains some of the issues involved in trajectory optimization during long flights.

Another known approach to flight plan optimization has been to consider mathematical programming techniques such as dynamic programming. Most efforts in this area have been limited to free flight, which means the aircraft is unrestricted as far as navigation locations are considered on the ground and can fly pure lat/long flights. A grid of potential waypoints is constructed around a great circle route between the origin and the destination to develop an elliptical region of search. The potential waypoints are constructed so that their projections on the great circle route between the origin and the destination subdivides the great circle route into a number of stages. Thus, the structure of the problem gets transformed to a typical stage based dynamic programming problem. The problem is then solved using backward search by either decomposing the problem into a two-dimensional search over the location and a subsequent altitude profile search, or a combined four dimensional search over location, altitude and speed. The problem with this approach is the limitation to free flight, which is only relevant for some oceanic flights. Since commercial aircraft have to follow a network of airways and VOR/NDB fixes, this kind of a stage-based dynamic programming formulation is difficult to construct in real life.

Another problem is that the selection of an elliptical region around the great circle is a poor technique because the weather situation on any given day may make the entire elliptical region unfavorable. If there is a thunderstorm or a restricted airspace between an origin and a destination, an elliptical region may become impossible to construct. Moreover, if the problem is decomposed into location search and altitude search, the resulting flight plan is suboptimal because the location, altitude and speed of the aircraft are tightly coupled variables. Some known techniques employ the use of iteration in narrowing the elliptical region of search, but this makes the search slow and still remains an impractical way to solve the flight plan optimization problem.

There have also been some efforts at implementing recent advances in information technology for flight planning. One reference describes a commercial product being developed for meshing flight planning functions with real-time weather graphics. Another describes an expert system developed to support flight planning. However, these applications do not deal with the fundamental problem of developing an efficient, computationally robust optimization methodology that can be used for commercial flight planning functionality.

A need therefore exists for a system and method for generating minimum-cost airline flight plans in real time, where a large number of potential routes can be examined. The benefits from such a system and methodology include significant cost savings in fuel and time for an airline, and the ability to create a dynamic flight operations management system by integrating flight planning with other real time control issues in airline operations. Optimal flight planning enables an airline to better utilize its fleet of aircraft and allow more effective airline scheduling. Independent auditing has shown that the present invention may consistently save 3% on fuel and 1% on time for all flights using the National Route Program. The amount of savings is estimated at $30 Million per year.

The principal object of the present invention is to provide an innovative system and method for computing a minimum-cost airline flight plan in real time while satisfying the navigation, performance, weather, revenue and regulatory constraints for commercial airlines.

It is another object of the invention to provide a method for generating a minimum-cost airline flight plan that is capable of searching a large number of potential routes within an extremely fast computation time.

It is yet another object of the invention to provide a method for generating minimum-cost airline flight plans that may be incorporated into a dynamic flight operations management system.

It is still another object of the invention to provide a method for generating a minimum-cost airline flight plan that may be incorporated into a system for simulating airline operations to aid in the design and testing of airline schedules as well as in the performance of reliability analysis and payload analysis for the entire airline operations.

SUMMARY OF THE INVENTION

In view of the above, the present invention provides a system and method for generating a minimum-cost airline flight plan from a point of origin through a set of fix points to a destination point.

According to the method of the invention, a set of navigation airways, including fix points and vectors for high altitude flight, and a set of predetermined altitudes is stored in a database. Operational data for the flight and weather data is also stored in the database. A two-dimensional macro region is then identified, and the fix points located within the two-dimensional macro region are transformed to an alternate coordinate system where the origin of the alternate coordinate system is the point of origin of the flight. The destination point of the flight is on one of the axes of the alternate coordinate system. An acyclic network is constructed within the macro region wherein the transformed fix points are the nodes of the network. The acyclic network further comprises a plurality of arcs. Each arc is assigned a plurality of weights based on the wind distance of said arc at each of the set of predetermined altitudes. This acyclic network is used to determine a two-dimensional feasible region for conducting a search for the minimum cost flight plan. A feasible acyclic network is constructed which includes only those arcs of said acyclic network of the macro region which lie within the feasible region and outside of any flight restricted areas. A plurality of minimum-cost paths from the origin to each of the fix points in the feasible acyclic network is calculated, where the cost of each arc is the shortest wind distance at a specified altitude, and the cost of each minimum cost path is stored. A minimum-cost flight path from the point of origin through a plurality of points to a destination point is then calculated using the stored values, weather data for all predetermined altitudes, aircraft weight and payload data, and performance data using separate dynamic programming computations over each arc.

According to the system of the invention, a land-based general purpose computer is provided with a memory in which a plurality of databases are stored. The databases comprise a set of predefined navigation airways, including fix points and vectors for high altitude flight, and a set of predetermined altitudes used in flight planning. The databases also include station data, station approach and departure procedures, predefined flight restricted areas, operational data, and weather data. Means are provided for execution within the general purpose computer to determine the minimum-cost airline flight path from a point of origin through a set of navigation fix points to a destination point. The minimum-cost path is determined within an acyclic network that is constructed within a feasible search region that in turn is determined from within the boundaries of a 2-dimensional rectangular macro region.

The present invention preferably uses a four-dimensional dynamic programming based search algorithm. The present invention utilizes weather data, aircraft performance data, navigation data and FAA flight planning constraints to develop an optimal flight plan that simultaneously optimizes the parameters of ground route, altitude and aircraft speed. The invention can simultaneously analyze millions of options to select the optimal flight trajectory and perform this optimization within half a second of computation on a desktop computer workstation. The presently preferred algorithm uses dynamic programming, shortest path network optimization, and innovative search techniques to provide the fastest possible answer for practical flight planning application while guaranteeing the optimal flight plan generation.

The present invention also preferably works seamlessly with other aspects of flight planning technology such as the weight and balance computation, surface weather, forward flight planning and the operation of the flight management computer on board the aircraft. The invention avoids restricted areas including NOTAM restricted areas and thunderstorms. The invention also provides the flexibility of various what-if analyses that is necessary for a practical flight planning system. The invention can be integrated with other real time operation tools to provide a dynamic flight operations system. Another significant application is to use the invention as an engine for a simulation tool that utilizes historical weather data to develop distributions for airline scheduling, reliability analysis and payload analysis during fleet assignment.

These and other features and advantages of the invention will become apparent upon a review of the following detailed description of the presently preferred embodiments of the invention, taken in conjunction with the appended drawings.

BRIEF DESCRIPTION OF THE DRAWINGS

FIG. 9 illustrates a presently preferred method of performing a short segment cruise computation;

FIG. 10 illustrates a presently preferred method of performing a climb computation; and FIG. 11 illustrates one preferred flow chart for a simulation tool created around the system and method of the present invention.

DETAILED DESCRIPTION OF THE PRESENTLY PREFERRED EMBODIMENTS OF THE INVENTION

Methods and systems for generating an optimal flight plan for airline operations control are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

I. Overview of the Flight Planning Process

Figure 1:
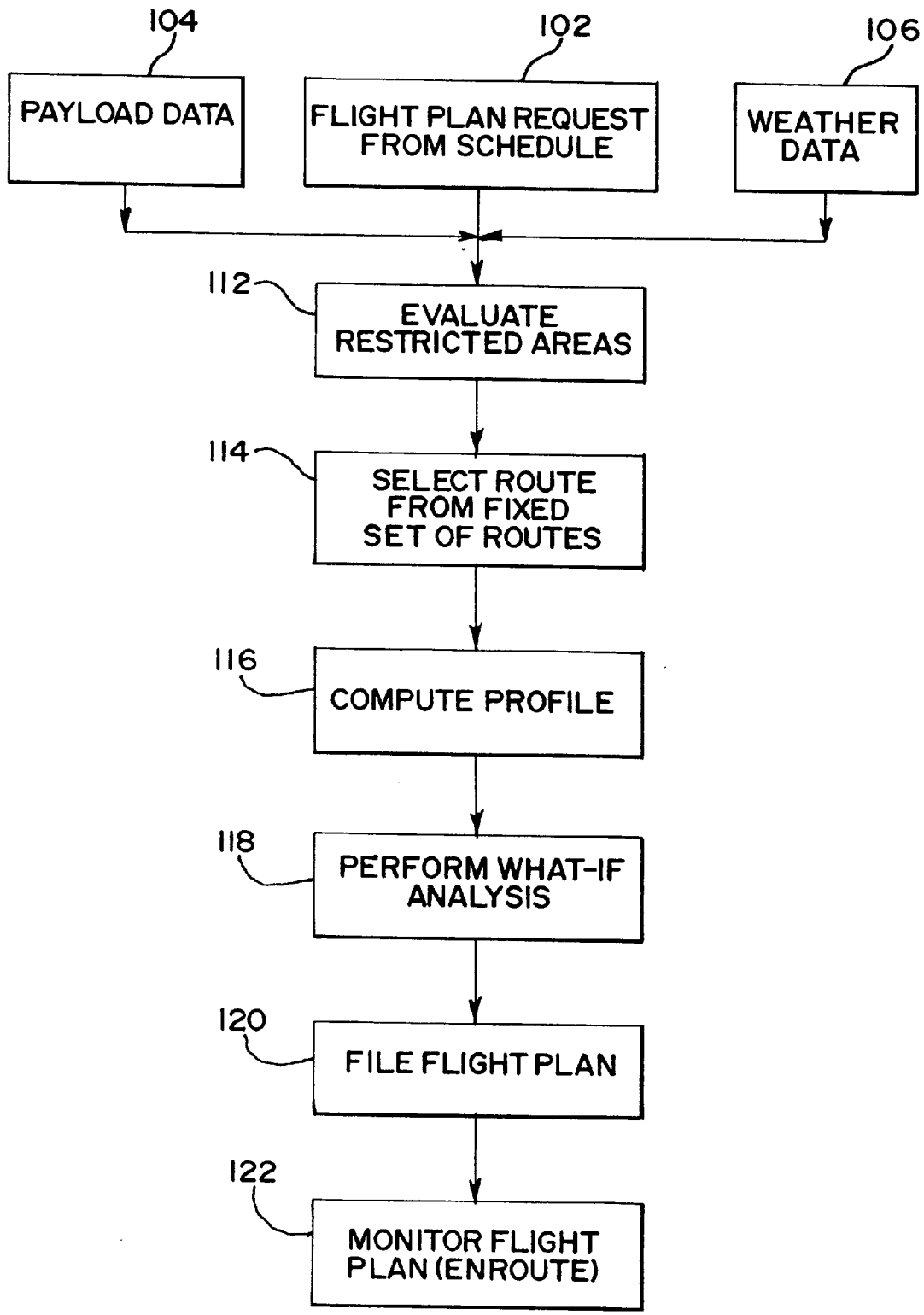
FIG. 1 is a flowchart showing the steps involved in a conventional airline flight planning process.

Referring now to the drawings, and more particularly to FIG. 1 thereof, there is shown a flowchart of a conventional process for generating a flight plan employed in the prior art. In the conventional process, flight plans are generally requested several hours before the departure time listed on the master schedule, as shown in step 102. The key data in a flight plan request made in step 102 include departure time, point of departure, and point of arrival. Other key data that is input into the conventional flight planning process include payload data 104 and weather data 106. Payload data 104 may be obtained from the aircraft type and the passenger reservations system. Weather data 106 may be obtained from online sources as discussed below.

In the conventional process, each pair of departure and arrival cities generally has a set of twenty fixed routes of travel from the departure city to the arrival city. The weather data 106 is used to assign approximate weather conditions along each of the fixed routes and evaluate any restricted areas (e.g. severe weather areas), as shown in step 112. In this way, a rough estimate of each ground route is obtained and the fastest route is found, as shown in step 114. Once the route is selected, the rough estimate of the ground route is used to develop the altitude and speed schedule. Next, the flight profiles for each altitude and mach number are developed, as shown in step 116. The flight profiles are further refined by using the wind distances across all altitudes to determine the best combination of altitudes and mach numbers that provides the lowest fuel and time costs. Various what-if analyses 118 may be performed on the completed flight plan to determine the optimum balance between fuel cost and time cost. In addition, other factors such as connecting passenger loads, airport gate availability, and flight delays and cancellations may also be considered in the what-if analysis to help fine tune the altitude and speed schedule.

Once the flight plan has been generated and the initial what-if analyses performed, the flight plan is filed with the FAA for approval in step 120. The flight plan may also be transmitted to the flight crew at the airport for review. Concurrent with the filing and review of the flight plan and continuing until the completion of the flight, the flight plan is monitored in step 122 for late-breaking changes in weather conditions, payload, or airport constraints. However, the limited number of possible routes and the fixed nature of such routes, as well as the time-consuming manual evaluation of weather and payload data of the conventional prior art process make the conventional process cumbersome and vulnerable to human error.

Figure 2:
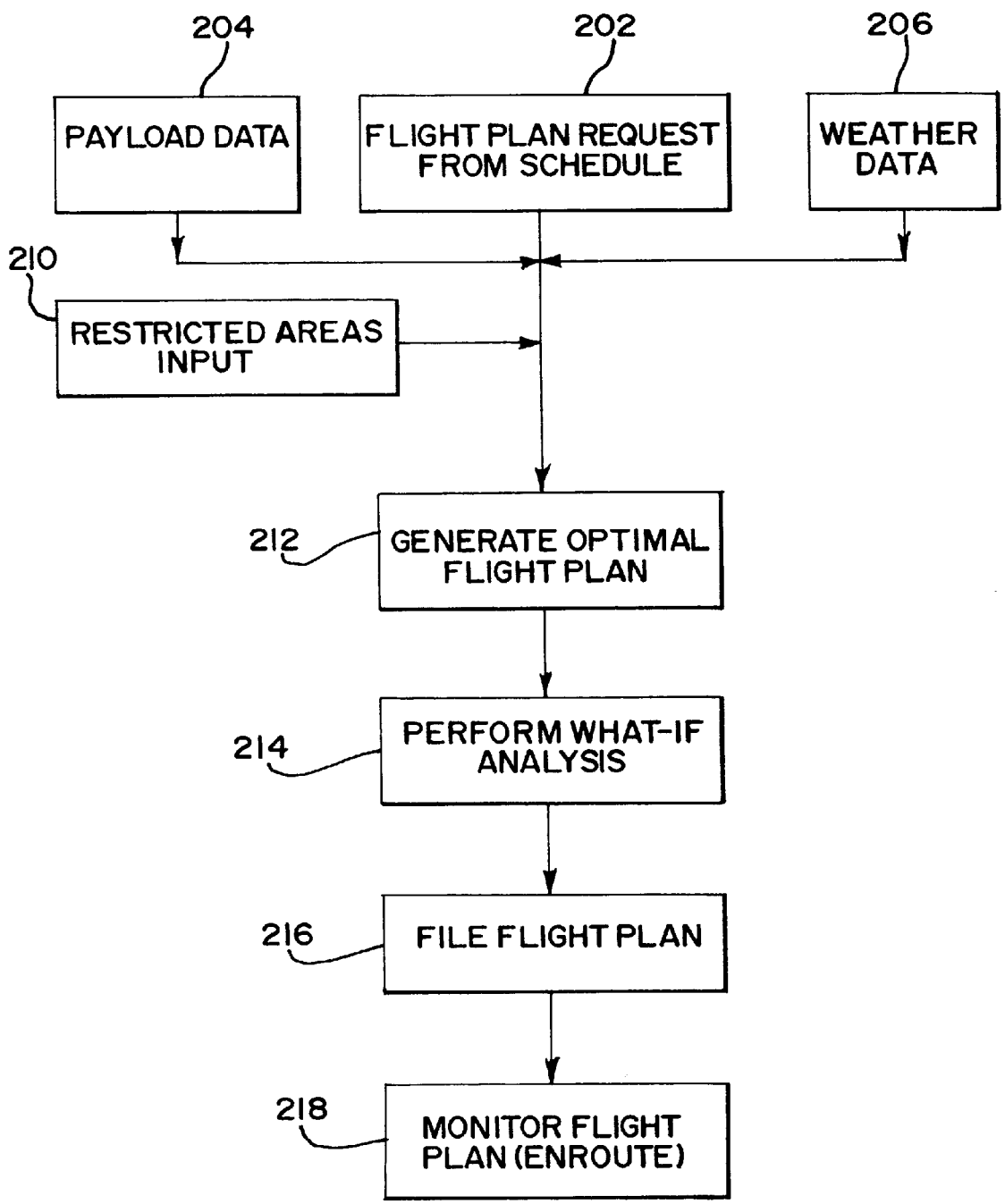
FIG. 2 is a presently preferred flowchart showing the steps involved in an airline flight planning process utilizing the method of the present invention.

In FIG. 2, a flowchart illustrating the process for generating an optimal flight plan of the present invention is presented. As shown in FIG. 2, the initial inputs into the system and method of the present invention are quite similar to the initial inputs into the prior art process shown in FIG. 1. Flight plans are requested several hours prior to the scheduled departure time, as shown in step 202. Key data input into the process of generating an optimal flight plan includes payload data 204 and weather data 206. However, the system and method of the present invention includes an additional input parameter not used in the conventional prior art process. This additional input comprises a definition of the restricted areas, as shown in step 210. The restricted flight areas may constitute, among other things, areas of hazardous weather such as thunderstorms, and may be determined through evaluation of data from sources including the weather data 206 and topographical data (not shown).

The payload data 204, weather data 206, and restricted areas data 210 are used by the system and method of the present invention in step 212 to generate a minimum-cost flight plan that is optimized simultaneously over location, altitude, and speed as described below. The optimization is enhanced through the use of a network of possible routes through a plurality of fix points, rather than the established set of fixed routes employed in the prior art. The input parameters may be varied in step 214 to perform a what-if analysis for any of a number of possible or probable scenarios. Finally, the optimally generated flight plan is filed with the FAA in step 216 in accordance with federal regulations, and may also be transmitted to the flight crew at the airport for review. The flight plan may be monitored after filing and enroute through the completion of the flight as shown in step 218.

It will be appreciated from the description below that the system and method of the present invention may be implemented in software that is stored as executable instructions on a computer storage medium, such as memories or mass storage devices.

II. Architecture of the System of the Invention

Figure 3:
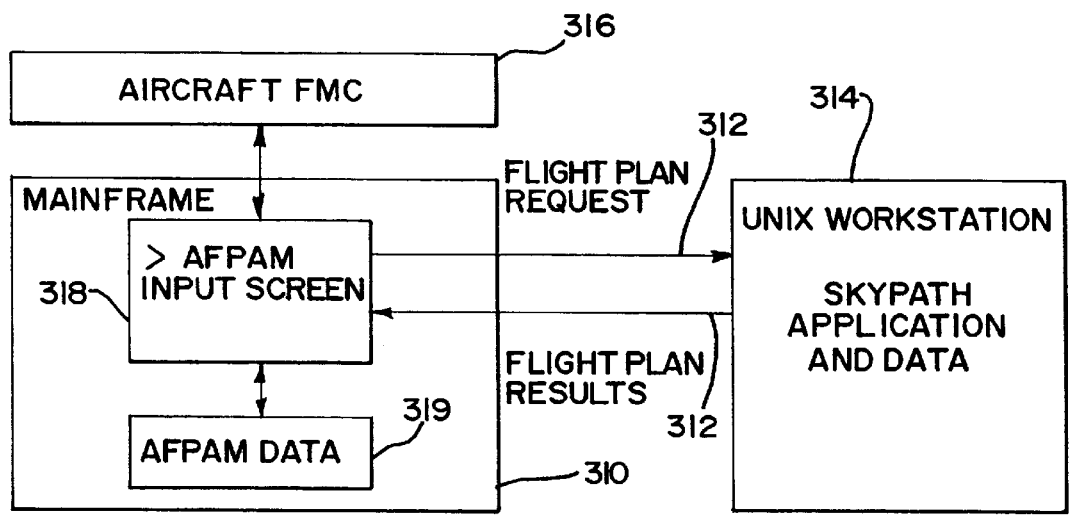
FIG. 3 is a system block diagram of one presently preferred embodiment of the present invention for carrying out the steps shown in FIG. 2.

An architecture of the flight planning system in its presently preferred embodiment is presented in FIG. 3. The system consists of a mainframe-based current flight planning system 310 that has a dedicated two-way communication link 312 with the general purpose computer 314 executing the flight planning computation, and a dedicated two-way communication with the Flight Management Computer (FMC) 316 on board the aircraft (not shown). In its most preferred embodiment, the method of the present invention may be run on a UNIX workstation having a two-way communications link with an existing Unimatic mainframe-based flight planning system such as AFPAM. The data sources of the method of the present invention include the weight and balance data, surface weather data, upper air weather data, airline schedule, and passenger reservation system data.

The weight and balance data forms part of the payload data 204 of FIG. 2 and provides the gross weight limits for takeoff and landing of any flight. This data may be located on a mainframe storage medium 319 or on a computer storage medium of the general purpose computer 314. The passenger reservation system may also be located on mainframe storage medium 319 and helps define the payload requirements for any flight. The surface weather data forms part of the weather data 206 and provides information for choosing alternates related to overmountain driftdown and ETOPS. Upper air weather data 204 also forms part of the weather data 206 and provides weather forecast data for winds and temperature at the altitudes used for flight planning. The airline schedule is the basis of the flight plan request 202 of FIG. 2 and provides the takeoff time, target time and aircraft type for each flight. As mentioned above, a software implementation of the present invention may also be stored on a computer storage medium (not shown) of the general purpose computer 314.

The present invention preferably uses ARINC 424 navigation data and maintains its own aircraft performance data. The navigation and performance data is updated on the mainframe 310 when there is a navigation data change or an aircraft performance data change. As shown in FIG. 3, the user interface implemented as an input screen 318 and resides on the mainframe 310. The dispatcher may request the flight plan in accordance with the airline schedule up to several hours before the scheduled time of departure. Any flight plan request is immediately transmitted to the general purpose computer 314 which performs the simultaneous optimization over position, altitude and speed to generate a minimum-cost flight plan. The resulting flight plan is communicated back to the mainframe 310. All flight plan computation data, except navigation and performance data, is communicated to the general purpose computer 314 by the mainframe 310. The communicated data includes upper air weather forecasts. The mainframe 310 can directly transmit flight plans to flight crew at the airport, or it can file the flight plans at FAA for approval. The mainframe also facilitates monitoring of a released flight with respect to the flight plan through a two-way communications link 312 with the aircraft FMC 316 for uploading new flight plans and getting information about flight positions.

III. Overview of Data Inputs

As mentioned above, there are several data inputs to the flight planning process. The first is the set of navigation airways. This data includes fixes and vectors for high altitude flight, station data, station approach and departure procedures and restricted areas. The navigation data for the system is obtained from industry standard data such as ARINC 424. This data is typically updated every 28 days with updated information received from Jeppesen, Inc. The system may also receive on-line live navigation data updates from an airline dispatch operations center.

The second data input is the weather data. In its presently preferred embodiment, the system may receive twice a day marsden square based weather updates from the mainframe 310 of FIG. 3. The system may also receive on-line, non-periodic weather updates. The weather data should preferably consist of weather forecasts for the next 24 hours. The system may also use weather data from higher granularity sources such as GRIB.

The third data input is the performance data input, which may be obtained from and regularly updated by the flight engineering department of any commercial airline. The performance data is obtained from the airline's fleet of aircraft. Operational data for each flight such as start date and time, payload, scheduled flight time (also called target time), origin and destination and other miscellaneous items are sent to the general purpose computer 314 from the mainframe 310 each time a flight dispatcher wishes to compute a flight plan. Data regarding thunderstorm activity is preferably input by the flight dispatchers by defining the area on a U.S. map presented as a GUI interface on the mainframe 310.

Figure 4:
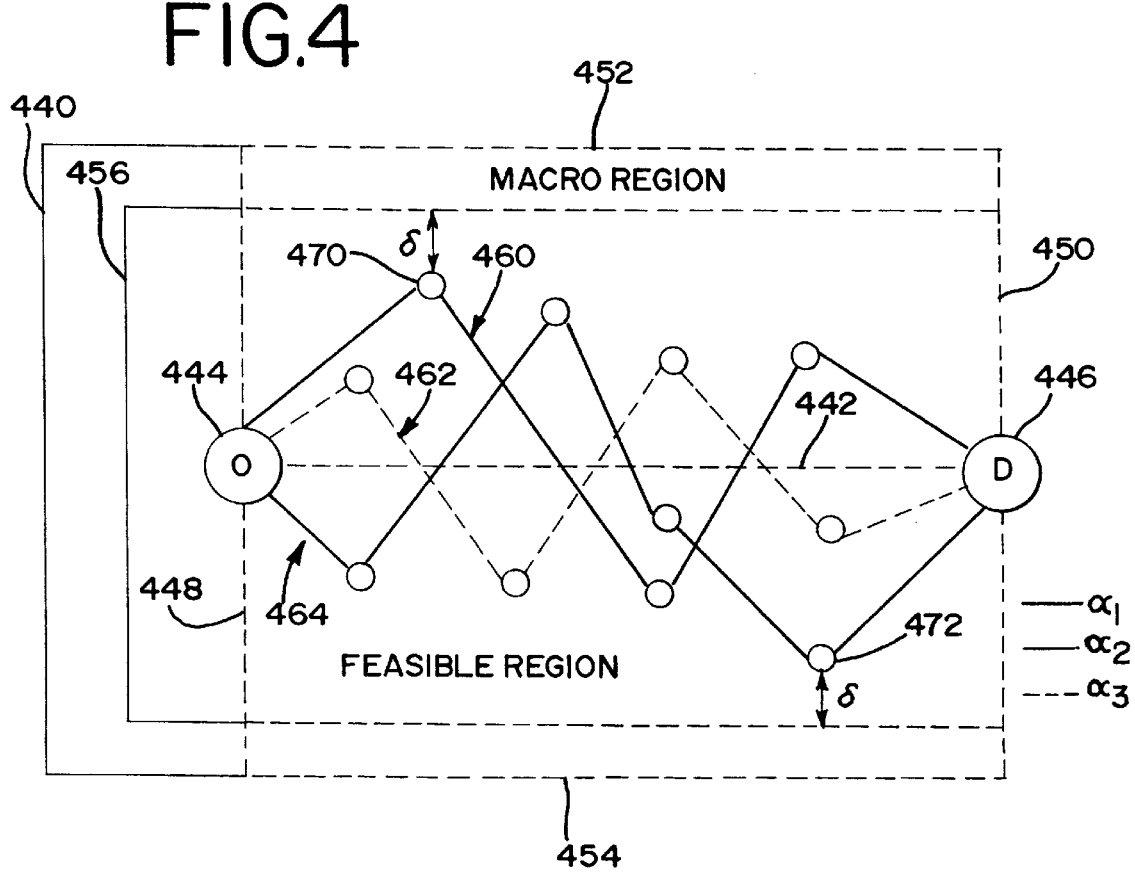
FIG. 4 illustrates a presently preferred method of transforming a navigation fix point expressed in terms of latitude and longitude coordinates into an alternate coordinate system.

IV. Overview of the Minimum-Cost Flight Path Generation Algorithm of the Present Invention Flight planning in the present system proceeds in a number of steps. The entire flight network is loaded into the memory when the general purpose computer 314 (FIG. 3) is brought on-line. This avoids any time-consuming database queries to the database files at mainframe 30 at run time. Each flight plan is then run as a child process that works on the loaded network by selecting the sub-network that is relevant for the individual flight plan. The search algorithm of the present invention, shown in FIG. 4, is independent of the network structure to be used for computing a flight plan. For this reason, an airways-based network can be used as easily as a network for the National Route Program or a network for free latitude/longitude based flight. The algorithm works in several steps. In the first step, a macro region 440, as shown in FIG. 4, is identified by considering the great circle route 442 from the origin 444 to the destination 446. Using this route as one axis, the algorithm constructs normals to the great circle route at the origin and destination. The macro region is preferably bound between normal 448 at the origin 444 and a normal 450 at the destination 446. The other bounds are preferably two in number and are placed by considering a maximum vertical distance from the great circle route. These bounds are designed to be very large in order to ensure that any realistic flight plan will be contained in this macro region. For example, bounds for the macro region 440 may be set at first bound 452 and second bound 454.

The second step is to identify a search region for actual flight plan search. The search region is a subset of the macro region and will be referred to as the feasible region 456. The design of the feasible region is very critical. Ordinarily, if there were no weather-related constraints, the optimal flight plan would be along the shortest ground distance path along the airways. However, the route selection is influenced by weather at different altitudes. Therefore, the method of the present invention ranks and orders the fixes in the macro region 442 according to their intercepts on the great circle route. The vectors are classified to select only those vectors that make the network acyclic. Weather-compensated shortest time paths are computed along the acyclic network by considering the weather at each possible flight planning altitude. This set of shortest time paths is used to select the farthest fixes which bound the favorable weather area of the network. This area is the most favorable for flight planning and will be variable in size and location for different flights. An additional buffer area of significant size is added to these bounds to design the feasible region 456 for flight plan searching. The actual flight plan search over the feasible region 456 starts with two shortest path searches. These are carried out to setup the climb and descent computations for the flight plans. The shortest time paths preferably consider the weather situation at 18000 feet, which is the designated altitude for climb and descent computation, although any of a number of altitudes may be designated for computation.

One search is carried out as a forward search from the origin and the other search is carried out as a backward search from the destination. As a part of the search, each fix gets a weather-compensated shortest distance from the origin and the destination.

The flight plan search is carried out as a backward search over the network starting with the destination point. This is because the only invariants are the payload, aircraft weight and the reserve fuel weight. It costs fuel to carry fuel, so a forward search is difficult to carry out without making a number of iterations to reach the payload requirement. The backward search proceeds through the descent, cruise and finally the climb computations and considers only those vectors in the feasible region that comprise an acyclic network. The shortest paths computed for descent are used to compute the descent fuel and time. The cruise search is carried out by performing searches along each altitude for each vector of the network with the objective being minimum cost as provided by the following equation:

$$C_o = \min\ (C_f F + C_t T) \tag{1}$$

where $C_o$ is the total cost, $C_f$ is the fuel cost, F is the fuel burn, $C_t$ is the time cost and T is the total time. Each individual vector is expanded over the third dimension of altitudes, and a vector minima for each altitude is computed.

For any vector, a stage-based dynamic programming problem is solved where each stage is constructed at 50 nautical miles (nm) and the state space consists of altitude points at that stage. At any point of the state space, there are two options: (1) to cruise, or (2) to step climb to one higher altitude. Both options are available at each of the predetermined altitudes, except at the highest altitude, where cruise is the only option. The minimum cost for each option is stored at each state. The search proceeds backwards through the stages until the altitude points over the vector get the minimum values over the vector. Since any fix can have a number of vectors going ahead to other fixes, the vector minima for each altitude is compared over all the feasible vectors going ahead to store the fix minima for all the altitudes. The shortest paths for climb are then used at the initial stage to compute the possible climb options. Considering all the three issues of climb, cruise and descent, an overall flight plan is generated by tracing the optimal flight plan through the network giving the route and the profile at the same time.

The fourth dimension of flight planning, namely speed, can be considered using one of two possible methods. One method is to consider it while calculating the vector minima for each altitude. Different mach numbers may be used to compute the vector minima. Each vector can then store the vector minima of cost with the preferred speed. The cost of fuel is a well known quantity, but the cost of time is not. Depending on corporate goals, a ratio of Cf/Ct can be set up to compute the minimum cost flight plan across all four dimensions. This ratio is called the cost index or pounds-per-minute index. Different cost index values may be set up to carry out the trade-off analysis between the fuel cost and the time cost in order to select the preferred cost index for an individual flight. According to this method, the speed varies at each vector of the flight plan.

The second method is to carry out a three-dimensional search to get the base flight plan. Then over the selected route, flight plans are computed by constraining the altitudes and selecting mach numbers to give flight plans that are speeded up or slowed down. The flight plan that is closest to the scheduled flight time or target time is selected. According to this method, the speed is different across flight plans but constant throughout an individual flight plan. The two different speed optimization methods have been chosen to provide airlines with a flexible way to transition to true minimum cost flight plan optimized across four dimensions.

The trade-off analysis mentioned above need not be restricted to only fuel and time. Other factors such as connecting passenger loads, airport gate availability, and irregular operations information such as flight delays cancellations can be used to carry out a meaningful trade-off analysis for selecting the right cost index and speed schedule for the flight plan. This makes the present invention useful as a dynamic flight operations management system. The system and method of the present invention therefore become very important for en route flight planning.

The problem of en route flight planning involves the creation of a forward flight plan once the aircraft is ready to take off or the aircraft is at an intermediate point of the flight plan. Due to a real time change in operating conditions such as weather, the aircraft will require new optimal flight plans from the current aircraft position to the destination. The method of the present invention carries out forward flight planning to solve this problem by carrying out a forward search over the feasible region. This provides a powerful tool for managing the entire flight. The method of the present invention is also equipped to handle issues such as over-mountain driftdown, overwater driftdown/decompression and ETOPS. These issues are handled mainly by manipulating the acyclic network over the feasible region for flight planning and setting up appropriate restrictions.

V. A Dynamic Programming Method to Generate A Minimum-Cost Flight Path

Figure 5:
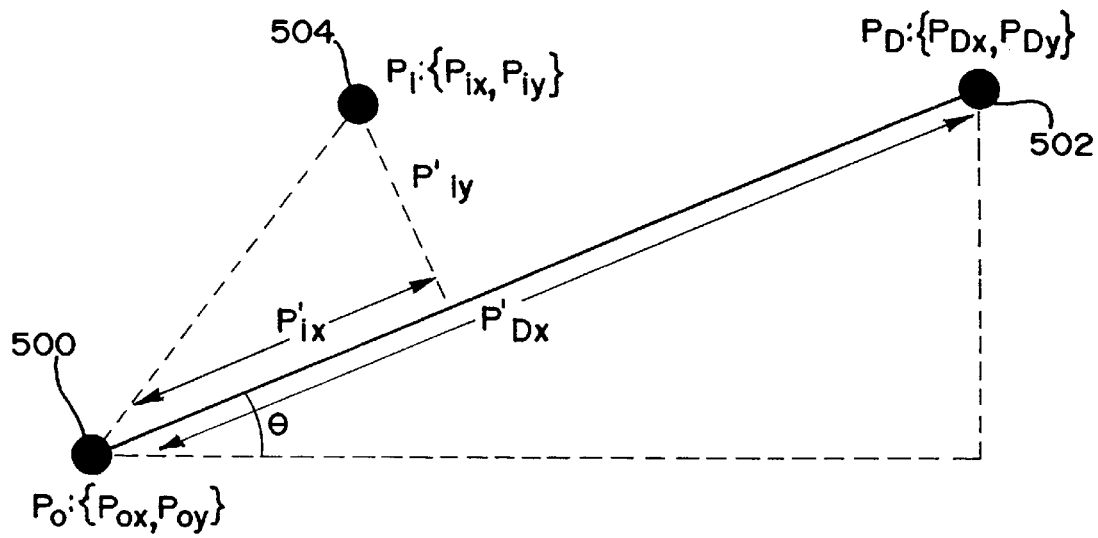
FIG. 5 illustrates one example of a feasible region and a macro region between the point of origin and the destination point.

The first step in the flight planning process is to design the macro region 440 of FIG. 4, denoted $M_R$. The great circle route $G_C$ is constructed between the origin O of FIG. 5 and destination D 502. As shown in FIG. 5, any given fix point 504 in the navigation database is represented as $P_i:\{P_{ix}, P_{iy}\}$ where $P_{ix}$ is the latitude and $P_{iy}$ is the longitude of the point. Therefore, the origin 500 can be represented as $P_O:\{P_{Ox}, P_{Oy}\}$ and the destination 502 can be represented as $P_D:\{P_{Dx}, P_{Dy}\}$. The orientation from the origin 500 to the destination 502, denoted a, is given as:

$$\theta = atan\left(\frac{|P_{Dx} - P_{Ox}|}{|P_{Dy} - P_{Oy}|}\right) \quad (2)$$

This orientation is used to transform the orientation of a untransformed point $P_i$ in terms of a new coordinate system where the origin 500 is at $P_O$ and the destination 502 is at $P_D$ and is a point on the new axis from $P_O$ as shown in FIG. 5. Therefore, the origin 500, $P_O$, is mapped to $P'_O:\{0,0\}$ and the destination, $P_D$, is mapped to $P'_D:\{P'_{Dx}, 0\}$. A general point $P_i$ 504 is shown in FIG. 5 and is represented as $P'_i:\{P'_{ix}, P'_{iy}\}$. The coordinates of $P_i$ are derived as follows:

$\delta_x = P_{ix} - P_{Ox}$ $\delta_y = P_{iy} - P_{Oy}$ $P'_{ix} = \delta_x \cos\theta - \delta_y \sin\theta$ $P'_{iy} = \delta_x \sin\theta + \delta_y \cos\theta$ In order to define the macro region $M_R$, the maximum limits of the new coordinate system are selected as follows:

$X_{max} = P'_{Dx}$, $X_{min} = 0$ $Y_{max} = K_y$, $Y_{min} = -K_y$

This implies that fixes are not considered if they are located before the origin or after the destination according to their projection on the great circle. The limits $K_y$ on either side of the great circle, examples of which are shown at first bound 452 and second bound 454 of FIG. 4 and represent a realistic large limit for flight planning purposes. The arrival and departure procedures at an airport are considered in this analysis and special arrival or departure procedures which turn around are considered as exception cases to the above formulation. The macro region $M_R$ can then be represented as a set of points given by:

$$M_R = \{\forall i\ P_i: \{P_{ix}, P_{iy}\} \in M_R | X_{min} < P'_{ix} < X_{max},\ Y_{min} < P'_{iy} < Y_{min}\} \quad (3)$$

The next step is to sort the points in the macro region based on their intercepts on the great circle between the origin and the destination. If $_\psi(P_i)$ is the ordinality of the point $P_i \in M_R$, i.e. the sequence number of the point in the set of points, the objective is to sort $M_R$ such that $_\psi(P_i) <_\psi(P_j)$ if $P'_{ix} < P'_{jx}$ assuming that $P_i$, $P_j \in M_R$. This operation will determine which point is ahead of the other in terms of flying from the origin to the destination.

Next, an acyclic network is constructed in the macro region based on the vectors read in from the navigation database. A general network consisting of all the vectors is constructed by defining each arc $A_{ij}:\{P_i \to P_j\}$ as a feasible arc representing a vector in the database connecting $P_i$ to $P_j$. An acyclic network $N_R$ is constructed by considering only those arcs which connect a point of lower ordinality to a point of higher ordinality:

$$N_R = \{\cup A_{ij}\ \forall i,j | P_i \in M_R, P_j \in M_R,\ _\psi(P_i) <_\psi(P_j)\} \quad (4)$$

The weather variables are stored at a point in the form of a three tuple of wind direction, wind value and temperature value at each altitude α:

$$W_{Pi,\alpha} = <W_D, W_V, T>_{Pi,\alpha} \quad (5)$$

Along each arc $A_{ij}$, the weather along the arc at each altitude is resolved by considering the trigonometric components of the weather at each altitude along the bearing of the arc:

$$W_{Aij,\alpha} = <W_V, T>_{Aij,\alpha} \quad (6)$$

Let $d_{ij}$ be the ground distance of the arc $A_{ij}$ and the mach number for flight plan computation be $M_n$. The mach air speed is given as $mas_{Aij,\alpha}$ while the true air speed is represented as $tas_{Aij,\alpha}$. Assume that $T_{SAij,\alpha}$ is the standard temperature at altitude α:

$$mas_{Aij,\alpha} = 39 * M_n * (273 + T_{SAij,\alpha})^{0.5} \quad (7)$$

$$tas_{Aij,\alpha} = 39 * M_n * (273 + T_{Aij,\alpha})^{0.5} \quad (8)$$

The difference between the two values is that the first is computed using the standard temperature at an altitude and the second is computed using the actual altitude. The wind distance $d_{Wij}$ along each arc $A_{ij}$ is then defined as follows:

$$d_{Wij} = (d_{ij} * mas_{Aij,\alpha})/(tas_{Aij,\alpha} - W_{VAij,\alpha}) \quad (9)$$

The wind distance is the equivalent distance traveled by the aircraft when it flies through the entire arc $A_{ij}$ under the actual weather conditions. If there is a head wind, the equivalent distance is longer than the no wind condition, while the reverse is true under tail wind conditions.

A path $P:P_{OD,k,\alpha}$ is defined as a sequence, denoted k, of arcs over the network $N_R$ connecting $P_O$ and $P_D$ considering weather at altitude cc. Since the network is acyclic in nature, the path does not contain any cycles. Theoretically, there are numerous possible paths depending on point and arc combinations in the network. Under no wind conditions, the shortest path would be the path closest to the great circle. However, if the weather conditions are considered, the shortest path will vary based on weather conditions which can make a longer arc more favorable due to a high tail wind. The value of a path P is represented as $V_P = \Sigma V_{Aij,\alpha}$, where $V_{Aij,\alpha}$ is the cost of an arc $A_{ij} \in P$. The cost of each arc can be any entity. For setting up the region, the value of each arc is the wind distance of the arc at a specified altitude.

Hence the shortest path SP: $P_{OD,\alpha}$ is defined as the path which has the smallest value. Therefore, the value of the shortest path may be denoted as $V_{SP}$ and $V_{SP} = \min(V_P) \forall P$. In order to efficiently find the shortest path, the following principle is used: If a path $P_{OD,\alpha}$ is the shortest path from $P_O$ to $P_D$, then the shortest path from an intermediate point $P_\beta$ to $P_D$ is a proper subset of the path $P_{OD,\alpha}$. This can be proved as follows:

Let the value of the path from $P_O$ to $P_\beta$ be $V_1$ and the value from $P_\beta$ to $P_D$ be $V_2$. Then $V_{SP}$ is the sum of $V_1$ and $V_2$. $V_1$ is either totally independent of $V_2$ or monotonic with $V_2$ (i.e., if $V_2$ increases, $V_1$ is higher). For the wind distance cost function, $V_1$ and $V_2$ are independent. Now, if $P_\beta$ to $P_D$ has some other shortest path then there exists a value $V'_2 < V_1$ for a path from $P_\beta$ to $P_D$. Therefore $V_1 + V'_2 < V_1 + V_2$. So $V_{SP} > V_1 + V_2$, which is impossible because $V_{SP}$ is the path with the least value. Therefore, the shortest path from $P_\beta$ to $P_D$ has to lie on the shortest path from $P_O$ to $P_D$.

To summarize the algorithm used to determine the feasible region $F_R$ for the flight planning search can be thus set forth as follows:

1. Create a set $A_L$ for all altitudes used in flight planning.
2. Compute the shortest path $P_{OD,\alpha} \, \forall \, \alpha \in A_L$ over the network $N_R$.
3. For each path $P_{OD,\alpha}$ find the point $P_\eta$ which has the maximum value of $P'_{\eta y}$ and the point $P_\mu$ which has the minimum value of $P'_{\mu y}$.
4. From the points selected in step 3, find the point $P_\kappa$ and $P_\nu$ that have the maximum $P'_{\kappa y}$ and minimum $P'_{\nu y}$ values over all $\alpha$.
5. The points $P_\kappa$ and $P_\nu$ are used to create the bounds for the feasible region $F_R$. An additional buffer value $\zeta$ is added to $P'_{\kappa y}$ and subtracted from $P'_{\nu y}$ to set the bounds as follows:

$$X_{max} = P'_{Dx} \quad X_{min} = 0$$

$$Y_{max} = P'_{\kappa y} + \zeta \quad Y_{min} = P'_{\nu y} - \zeta$$

6. The feasible region $F_R$ is created according to:

$$F_R = \{\forall i \, P_i : \{P_{ix}, P_{iy}\} \in F_R | X_{min} < P'_{ix} < X_{max}, Y_{min} < P'_{iy} < Y_{min}\} \quad (10)$$

7. Construct a feasible acyclic network $FN_R$ so that the arcs lie with the feasible region $F_R$.

$$FN_R = \{\cup A_{ij} \, \forall i,j | P_i \in F_R, P_j \in F_R, \psi(P_i) < \psi(P_j)\} \quad (11)$$

The algorithm described above consists of finding a set of shortest paths, such as those denoted 460, 462, and 464 in FIG. 4, in the macro region using the weather conditions of each flight planning altitude. From this set of shortest paths, two points, 470 and 472, as shown in FIG. 4, are selected that have the maximum and minimum deviation from the great circle. An additional buffer is used to set up the maximum and minimum deviations from the great circle that will be used to design the feasible region for carrying out the actual flight planning search. The above algorithm is based on the assumption that weather conditions are variable but continuous over position and altitude. By considering each altitude's weather conditions to compute shortest paths and including a buffer, the feasible region is determined to be the union of the neighborhood of these shortest paths. The points in the feasible region are also sorted by the algorithm as they are filtered from the sorted macro region.

As mentioned previously, flight planning search is a backward search because the only invariant in the computation is the landing weight consisting of the payload, aircraft weight and reserve fuel weight. Because it costs fuel to carry fuel, the takeoff weight depends on the fuel burn computed to fly the entire flight. Since there are millions of options, the optimal takeoff weight depends upon the optimal flight plan chosen. The flight plan search starts by setting up the computations for the final descent and initial climb.

For the final descent, a shortest path is computed backwards from the destination using the weather conditions at 18000 feet. This path can be represented as $P_{OD,\alpha}$ where $\alpha = 18000$. The value of each arc is the shortest wind distance at 18000 feet. Due to the principle of the shortest path computation, each point $P_\beta$ also has the shortest path from that point to the destination computed and this path is represented as $P_{\beta D,\alpha}$. The shortest wind distance from any point $P_\beta$ to the destination is given as $DD_\beta$. The following algorithm is used to set up the descent computation:

1. Compute the shortest wind distance path $P_{OD,\alpha}$ during which the shortest wind distance for any point $P_\beta \in F_R$ is also computed as $P_{\beta D,\alpha}$ where $\alpha = 18000$ ft.
2. The actual shortest wind distance for any point $P_\beta$ to the destination is given as $DD_\beta$.
3. The descent fuel burn, time and distance are dependent on the altitude but do not vary significantly with top-of-descent weight. Therefore for any altitude, there is an average value of descent fuel burn, time and distance that is based on an average top-of-descent weight. The descent distance $C_\alpha$ for altitude a defines the contour of points around the destination from which the aircraft can descend if it is at an altitude of $\alpha$.
4. Classify each point by comparing $DD_\beta$ with the closest contours $C_{\alpha 1}$ and $C_{\alpha 2}$. Each point is then labeled using a contour flag $CF_\beta$ which is a function of altitude $\alpha 2$:

$$\forall \, P_\beta : (P_{\beta x}, P_{\beta y}) \in F_R, \text{ if } C_{\alpha 1} \leq DD_\beta < C_{\alpha 2}, CF_\beta = f(\alpha 2) \quad (12)$$

Figure 6:
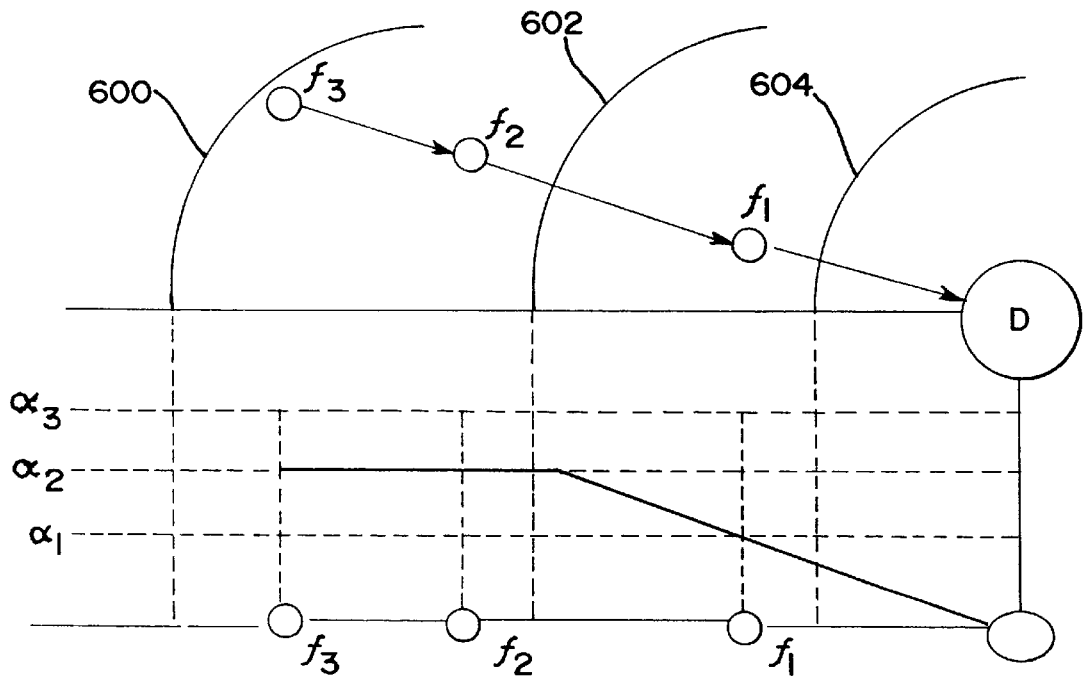
FIG. 6 illustrates a presently preferred method of performing a descent computation.

The contour flag $CF_\beta$ is used to determine that the point $P_\beta$ is within the descent zone for all altitudes above $\alpha 1$ altitude. The altitudes $\alpha 1$ and lower can be considered for cruise computation. The graph of FIG. 6 shows examples of descent computation contours 600, 602, and 604. The contours are set up by comparing the wind distance at 18000 feet for all points within the feasible region with the descent distance requirements for any altitude.

The initial climb computation is more complicated because the climb fuel, time and distance vary considerably with the top of climb weight and it is not accurate to consider average values. Therefore, at this stage, a shortest path using wind distance at 18000 feet is constructed using a forward search from the origin to all points in the network, and the rest of the logic is a part of the actual flight plan computation algorithm. There is no difference between constructing a shortest path from the origin and constructing a shortest path from the destination except that all the distances are now computed from the origin. Thus, the shortest path from the origin to any point $\beta$ can be represented as $P_{O\beta,\alpha}$ where $\alpha = 18000$. The shortest wind distance value from the origin is represented as $CD_\beta$.

The shortest path search process begins by considering the final descent first. Subsequently, the cruise is considered and finally the initial climb. The optimal flight plan from any point $P_\beta$ at altitude $\alpha$ to the destination is represented as $FP_{\beta D,\alpha}$. The flight plan altitude at the next point is represented as $\alpha'_{\beta,\alpha}$. This altitude can be different because the aircraft may choose to have a step climb in the computation from $P_\beta$ to $P_\gamma$ on arc $A_{\beta\gamma}$. The fuel burn and time on this arc is given as $B_{\beta\gamma,\alpha}$ and $T_{\beta\gamma,\alpha}$ respectively. The ground distance is represented as $d_{\beta\gamma}$. The optimal cumulative fuel burn and flight time is represented as $FB_{\beta D,\alpha}$ and $FT_{\beta D,\alpha}$ respectively. The overall cost function which is a proportional sum of fuel cost and time cost as shown in equation (1) is represented as $FV_{\beta D,\alpha}$.

The descent and cruise computations are dependent because the aircraft descends at different points for different altitudes and while one altitude may require descent, another lower altitude can still support aircraft cruising for a further distance. The algorithm for descent computation proceeds as follows:

1. If the contour flag of a point $P_\beta$, denoted by $CF_\beta$, corresponds to the lowest flight planning altitude, i.e. $CF_\beta = f(\alpha_{min})$, then point $P_\beta$ is the zone for descent for the altitude $\alpha$min and the next point $P_\gamma$ also lies in the same contour. There are two possible options:

a. If $A_{\beta\gamma} = A_{\beta D}$ and $A_{\beta D} \subset P_{\beta D,\rho}$ where $\rho = 18000$, then
   $FP_{\beta D,\alpha} = A_{\beta D}\ \forall$ altitudes
   $\alpha'_{\beta,\alpha}$ is undefined because it is still a part of descent.

This means that if the arc from $P_\beta$ to the next point $P_\gamma$ is the same as arc $A_{\beta D}$, the next point is the destination point. In that case, if the arc $A_{\beta D}$ lies on the shortest wind distance path from $P_\beta$ to $P_D$ at 18000 feet as computed during the setup for descent, it is selected as the first arc in the flight plan. Since all altitudes are descending, it is not possible to mark any altitudes on this part of the flight plan. Note that it is possible that a direct arc to the destination, such as the one being considered, need not be on the shortest wind path to the destination; it depends on the wind situation on other possible paths to the destination. The basic idea is that once descent has started the optimal path will be the shortest wind path at 18000 feet to the destination.

b. If $A_{\beta\gamma} \neq A_{\beta D}$ and $A_{\beta\gamma} \subset P_{\beta D,\rho}$ where $\rho = 18000$, then
   $FP_{\beta D,\alpha} = A_{\beta\gamma} \cup FP_{\gamma D,\alpha}\ \forall$ altitudes
   $\alpha'_{\beta,\alpha}$ is undefined because it is still a part of descent.

This means that if the arc from $P_\beta$ to the next point $P_\gamma$ is not the same as arc $A_{\beta D}$, the next point is not the destination point. In that case, if the arc $A_{\beta\gamma}$ lies on the shortest wind distance path from $P_\beta$ to $P_D$ at 18000 feet as computed during the setup for descent, it is added to the arcs in the flight plan. Since all altitudes are descending, it is not possible to mark any altitudes on this part of the flight plan. In neither of the above cases, is any fuel burn or flight time computed.

2. If the contour flag $CF_\beta = f(\alpha_2)$ where $\alpha_2 > \alpha$min and $CF_\gamma = f(\alpha_1)$, $\alpha_2 > \alpha_1$, then the altitudes higher than or equal to $\alpha_2$ can only be considered for descent. The altitudes from $\alpha_2$ until $\alpha_1$ are altitudes that start descent along the arc $A_{\beta\gamma}$, i.e., they have partial cruise until the top of descent and then the descent starts. The altitudes lower than $\alpha_1$ need to be considered only for cruising because the points are farther than the distance required for descent to the destination from these altitudes. There are three possible scenarios:

a. If $A_{\beta\gamma} = A_{\beta D}$ and $A_{\beta D} \subset P_{\beta D,\rho}$ where $\rho = 18000$, then
   $FP_{\beta D,\alpha} = A_{\beta D}\ \forall$ altitudes
   $\alpha'_{\beta,\alpha}$ is undefined because it is still a part of descent.

This means that if the arc from $P_\beta$ to the next point $P_\gamma$ is the same as arc $A_{\beta D}$, the next point is the destination point. In that case, if the arc $A_{\beta D}$ lies on the shortest wind distance path from $P_\beta$ to $P_D$ at 18000 feet as computed during the setup for descent, it is selected as the first arc in the flight plan. Since all altitudes are descending, it is not possible to mark any altitudes on this part of the flight plan.

The fuel burn and flight time can be computed for altitudes less than $\alpha_2$ as follows: For altitude $\alpha_i$, where $\alpha_i < \alpha_2$, the remaining distance in the segment $D_c$ as $D_c = DD_\beta - C_{\alpha l}$ is computed. These distances are used to compute cruise fuel burn and flight time until the point of descent. The fuel burn and time of descent are added to these values at the altitude $\alpha_i$ to get the fuel burn, flight time and cost function value at point $P_\beta$. The fuel burn computation during cruise will be described later in detail.

b. If $A_{\beta\gamma} \neq A_{\beta D}$ and $A_{\beta\gamma} \subset P_{\beta D,\rho}$ where $\rho = 18000$, then
   $FP_{\beta D,\alpha} = A_{\beta\gamma}\ \amalg\ FP_{\gamma D,\alpha}\ \forall$ altitudes$>\alpha_1$
   $\alpha'_{\beta,\alpha}$ is undefined because it is still a part of descent.

This means that if the arc from $P_\beta$ to the next point $P_\gamma$ is not the same as arc $A_{\beta D}$, the next point is not the destination point. In that case, if the arc $A_{\beta\gamma}$ lies on the shortest wind distance path from $P_\beta$ to $P_D$ at 18000 feet as computed during the setup for descent, it is added to the arcs in the flight plan. Since all altitudes are descending, it is not possible to mark any altitudes on this part of the flight plan.

The fuel burn and flight time can be computed for altitudes between $\alpha_1$ and $\alpha_2$ as follows: For altitude $\alpha_i$, where $\alpha_1 < \alpha_i < \alpha_2$, the remaining distance in the segment $D_c$ as $D_c = DD_\beta - C_{\alpha l}$ is computed. These distances are used to compute cruise fuel burn and time till the point of descent. The fuel burn and time of descent are added to these values at the altitude $\alpha_i$ to get the fuel burn, flight time and cost function values at point $P_\beta$. The fuel burn computation during cruise will be described later in detail. For altitudes $\alpha_i < \alpha_1$, consider the segment for regular cruise computation.

c. If $A_{\beta\gamma} \neq A_{\beta D}$ and $A_{\beta\gamma} \not\subset P_{\beta D,\rho}$ where $\rho = 18000$, then
   Consider cruise for altitudes less than $\alpha_1$
   Ignore any descent computation This means that if the arc from $P_\beta$ to the next point $P_\gamma$ is not on the shortest path, only consider it for regular cruise computation at lower altitudes. It does not need to be considered for descent computation for higher altitudes.

3. If the contour flag $CF_\beta = f(\alpha_1)$ and $CF_\gamma = f(\alpha_2)$, where $\alpha_1 = \alpha_2$ and $\alpha_1 \wedge \alpha_2 > \alpha_{min}$, the altitudes greater than ax are considered for descent and the altitudes less than $\alpha_1$ are considered for cruise. For the altitude $\alpha_1$ itself, since both the points on the arc are in the same contour, the descent computation is already finished for $P_\gamma$. Therefore, there is only a need to compute for cruise along altitude a, between point $P_\beta$ to $P_\gamma$.

The most important aspect of flight plan computation is the cruise. During cruise a decision is made at a specified distance interval, e.g., every 50 nautical miles, whether there will be a cruise at the same altitude or a step climb to a higher altitude. Typically, it costs more to step climb as compared to cruising at an altitude. However, the higher altitude typically has better cruise fuel burn. The weather conditions also affect the decision made at each point. There are three aspects to the cruise computation: cruising over one vector, cruising decision over multiple vectors, and cruising in short segments.

Figure 7:
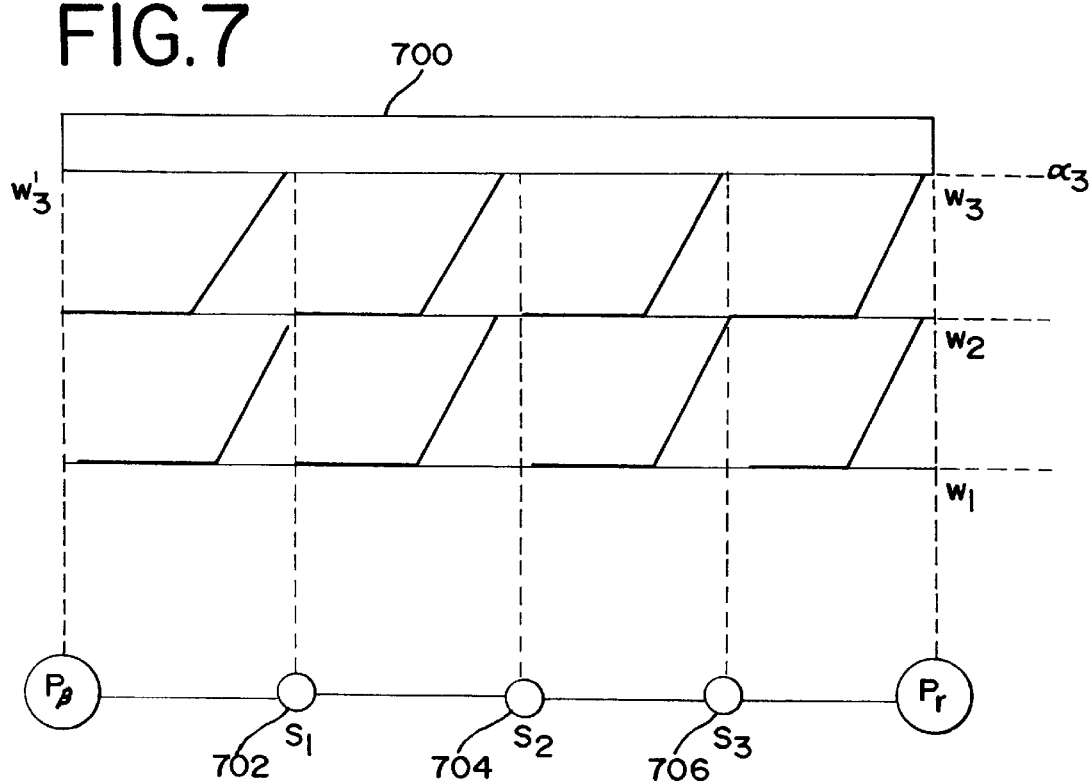
FIG. 7 illustrates a presently preferred method of performing a cruise computation over one vector.

Over one individual vector or arc $A_{\beta\gamma}$, the computation is solved as a dynamic programming problem. The state space consists of altitude points along the vector at 50 nm separation. The decision at each point is whether to cruise or climb. FIG. 7 shows the division of an individual vector 700, represented as $A_{\beta\gamma}$ into stages 702, 704, and 706, represented as $S_1$, $S_2$ and $S_3$. The number of stages is given as $n_s = d_{\beta\gamma}/50$. If there is any remaining distance, it is added to the last stage. The dynamic program works as a backward search going from the last stage to the first. At each stage, the optimal values and decisions are stored to be used in the subsequent stage. Thus, the optimal values at the first stage provide the vector minima of costs over the entire vector for each altitude point. Each stage is represented as $S_k$ where $0<k<n_s$. Each stage $S_k$ has the state variables $S_{k\alpha}$ where $\alpha$ is a flight planning altitude. The weight, time and cost value at each stage point is represented as $SB_{k\alpha}$, $ST_{k\alpha}$ and $SV_{k\alpha}$. The search proceeds backwards after descent. Over the vector $A_{\beta\gamma}$, the optimal fuel burn, flight time and cost function values at point $P_\gamma$ are available. The algorithm is as follows:

1. Compute backwards from $k=n_s-1$ until $k=0$. For $S_{k\alpha}$, there are two choices: cruise or step climb.
   a. For cruise, determine the distance $d_{stg}$ from $S_{k\alpha}$ to $S_{k+1,\alpha}$. The fuel burn $B_{cr}$ is computed as a burn function $f_B(d_{stg})$. The flight time is computed as $f_T(d_{stg})$. The burn function works as follows:
      i) Choose the nautical air miles value (nam) from the cruise fuel burn tables based on the weight at $S_{k+1,\alpha}$. For the last stage, the weight is the same as that at $P_\gamma$ at altitude $\alpha$.
      ii) Compute the nautical ground miles value (ngm) by considering the $mas_{Aij,\alpha}$ and $tas_{Aij,\alpha}$ at the altitude $\alpha$ using the policy mach as follows:

$$ngm=nam*(tas_{Aij,\alpha}-WV_{Aij,\alpha})/mas_{Aij,\alpha} \qquad (13)$$

iii) The burn $B_{cr}$ is given as:

$$B_{cr}=(d_{stg}*1000)/ngm \qquad (14)$$

The flight time $T_{cr}$ is given as:

$$T_{cr}=d_{stg}/(tas_{Aij,\alpha}-WV_{Aij,\alpha}) \qquad (15)$$

b. For climb, the climb tables are looked up to determine the step climb distance $d'_{stg}$ to go from $S_{k\alpha}$ to $S_{k+1,\alpha+1}$. Therefore, there is a cruise for the length $d_{stg}-d'_{stg}$ and a step climb for the remaining $d'_{stg}$. The burn $B_{cl}$ and time $T_{cl}$ are computed as follows:

$$B_{cl}=f_B(d_{stg}-d'_{stg})+f'_B(d'_{stg}) \qquad (16)$$

$$T_{cl}=f_T(d_{stg}-d'_{stg})+f'_T(d'_{stg}) \qquad (17)$$

where $f'_B$ and $f'_T$ are the burn and time values from the climb tables for the step climb.

2. Compute the cost functions at $S_{k,\alpha}$ for both cruise and climb. The cost value at the next stage cruise point is given as $SV_{k+1,\alpha}$ while the corresponding value at the next climb point is $SV_{k+1,\alpha+1}$. For the last stage, the cost values correspond to the values at point $P_\gamma$ for those altitudes.

$$V_{k,\alpha}=\min(C_f B_{cr}+C_t T_{cr}+SV_{k+1,\alpha}, C_f B_{cl}+C_t T_{cl}+SV_{k+1,\alpha+1}) \qquad (18)$$

The above equation defines how the cost values for cruise and climb over this stage are computed and compared. The altitude choice $\alpha'_{k,\alpha}$ for the next altitude is based upon which value is lower. If cruise value is lower, the next altitude is still $\alpha$, otherwise it is $\alpha+1$. The weight and flight time are determined by adding the burn and time to the cumulative burn and flight times respectively. Note that the above computations and comparisons were made for the three-dimensional search using the policy mach to calculate the true airspeed and the mach airspeed. If a four-dimensional search is desired, there are two options. One option is carry out the speed search at this stage. The second option is to carry out a summary analysis at the end of the 3D search over the chosen route.

If the first option is chosen, a value of the ratio $C_t/C_f$ or cost index is selected as per the airline's operating policy. This means that the airline provides a cost index by fleet for the tradeoff between time costs and fuel costs. It is also possible to select a set of cost indices and run the algorithm over each cost index to see the fuel vs. time tradeoff and select an appropriate cost index. For any cost index, the mach numbers are varied in equation 18 and the best value, altitude and mach number is stored at each point in the state space. During computation, the cost index value is varied over the flight because the relative costs will vary over the flight. This is again due to the fact that it costs fuel to carry fuel. The same ground distance of flight at an early stage may consume more fuel at the same altitude as compared to a later stage while the flight time stays constant.

For long haul markets with connecting flights, the fuel-time tradeoff analysis with a range of cost indices is important and forms the foundation of dynamic flight operations management. For medium to short haul markets, a company-decided policy cost index is satisfactory. For the second option, the 3D search is carried out by considering a cost index of 0. Thus, time costs are ignored and the flight plan search is carried out at policy mach. A summary analysis can be performed at the end of the search, as will be discussed later.

3. At the first stage, the values $SV_{0,\alpha}$ are the optimal values to fly at each altitude over the segment $A_{\beta\gamma}$. Assuming that the point $P_\beta$ has k vectors belonging to $FN_R$ that connect it to a point having a higher ordinal number in the set $F_R$, the vector minima of the cost value, fuel burn and flight time can be represented as:

$$[FV_{\beta D,\alpha}]_k=[SV_{0,\alpha}]_k \qquad (19)$$

$$[FB_{\beta D,\alpha}]_k=[SB_{0,\alpha}]_k \qquad (20)$$

$$[FT_{\beta D,\alpha}]_k=[ST_{0,\alpha}]_k \qquad (21)$$

The altitude decision $[(\alpha'_{\beta,\alpha})]_k$ at each altitude is determined by tracing the altitude choice at each stage ahead until the end of the vector.

Figure 8:
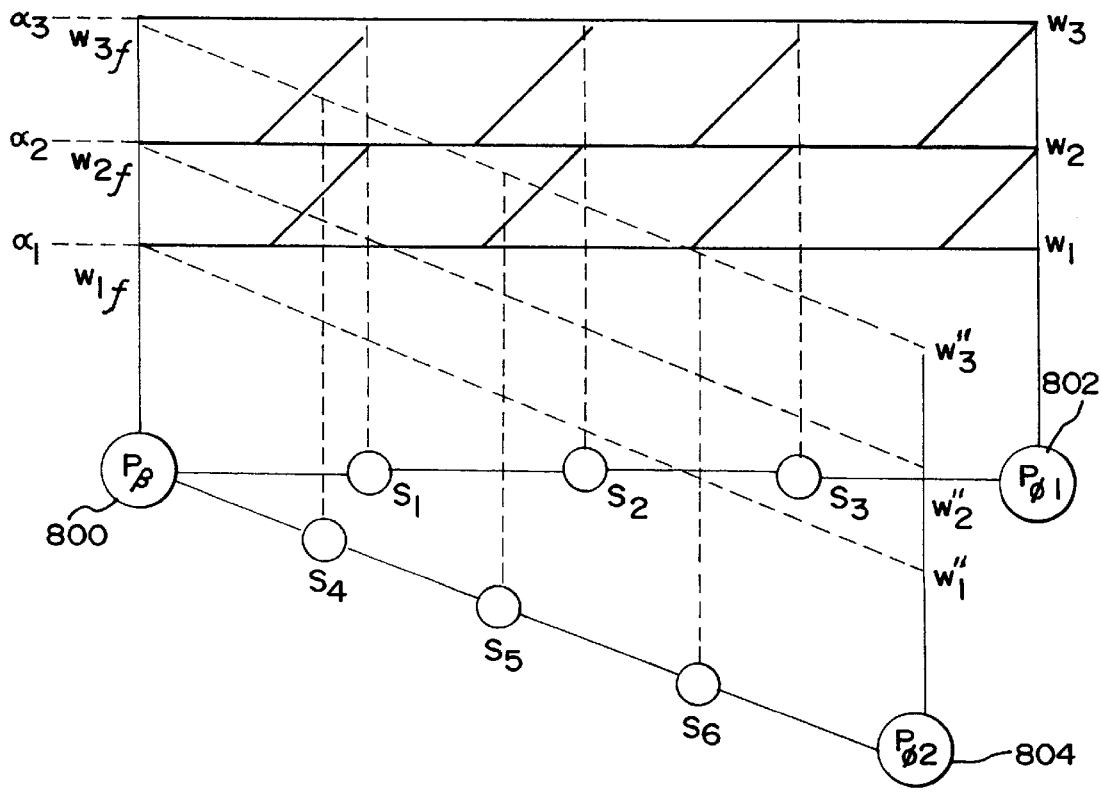
FIG. 8 illustrates a presently preferred method of performing a cruise computation over multiple vectors.

A point can be connected to multiple vectors in the network to points ahead of it as per the ordinality number in the set $F_R$. An example of such a point 800 is denoted $P_\beta$ in FIG. 8. The next step is to consider the minima over all the feasible vectors from the point in the acyclic network. Assume that $P_\beta$ is connected ahead to $P_{\phi i}$ where $0<i<k$, k being the number of the feasible vectors. In FIG. 8, at point 800, $P_\beta$ is shown connected to point 802, $P_{\phi 1}$, and point 804, $P_{\phi 2}$. Over all the segments k, the vector minima for each altitude is compared and the fix minima at each altitude point over the fix $P_\beta$ is determined. Different altitudes for the same fix can easily point to different vectors and different next altitudes depending on whether step climbs are involved:

$$FV_{\beta D,\alpha}=[FV_{\beta D,\alpha}]_{imin} \qquad (22)$$

$$FB_{\beta D,\alpha}=[FB_{\beta D,\alpha}]_{imin} \qquad (23)$$

$$FT_{\beta D,\alpha}=[FT_{\beta D,\alpha}]_{imin} \qquad (24)$$

$$P_{\beta D,\alpha}=FP_{\phi iminD,\alpha} \cup A_{\beta\phi imin} \qquad (25)$$

$$\alpha'_{\beta D,\alpha}=\alpha'_{\beta\phi imin,\alpha} \qquad (26)$$

The above computations are performed as a part of a backward search and the optimal values at each fix point are stored. Essentially, the optimal flight plan from each altitude at a fix point to the destination is being computed. Along with the optimal values, the best vector and altitude ahead are stored as the flight planning decision at each altitude point at a fix.

Some of the vectors in the cruise computation are small in size, especially between waypoints. For vectors smaller than 70 nm, there is an additional problem that a step climb decision cannot be computed as above because there is not enough distance for the step climb to occur in one segment. The step climb will therefore spill into the next vector. For such a situation, the algorithm is slightly different for the cruise computation along one vector. While the cruise decision stays the same, the step climb is considered differently, as shown in FIG. 9. For a short vector $A_{\beta\gamma}$, the cruise value is known at point 900, denoted $P_\beta$, at altitude $\alpha$. For a step climb to point 902, denoted $P_\gamma$, at $\alpha+1$, the weight 904, denoted $FB_{\gamma D, \alpha+1}$, is known. The algorithm for the short segment computation proceeds as follows:

1. Use the weight $FB_{\gamma D, \alpha+1}$ to determine the step climb distance 906, denoted $d'_\gamma$. This distance is greater than the vector length 908, denoted $d_{\beta\gamma}$. It is assumed that at a cruise point which is behind the point $P_\gamma$ at altitude $\alpha+1$ by the difference in distance 910 between $d'_\gamma$ and $d_{\beta\gamma}$ would approximately have the same step climb distance $d'_\gamma$. Thus, the basis for this assumption is that the weight difference between these two points is not substantial. This is reasonable because $d'_\gamma - d_{\beta\gamma}$ is a small distance.

2. Compute the step climb burn $B_{cl}$ and step climb time $T_{cl}$ as follows:

$$B_{cl} = f_B(d'_\gamma) - f_B(d'_\gamma - d_{\beta\gamma}) \qquad (27)$$

$$T_{cl} = f_T(d'_\gamma) - f_T(d'_\gamma - d_{\beta\gamma}) \qquad (28)$$

The distance 910, also denoted as $d'_\gamma - d_{\beta\gamma}$, is the excess distance required for step climb to the point $P_\gamma$ at altitude $\alpha+1$ given the weight at that point. The point behind it by this distance would have a weight lower than the weight at $P_\gamma$ for altitude $\alpha+1$ by the cruise fuel burn over $d'_\gamma - d_{\beta\gamma}$. Therefore, this cruise fuel burn as well as the time for cruise has a negative sign. However, as per the assumption mentioned in step 1 above, the climb fuel and time are approximately the same since the weight reduction is not substantial. Therefore, climb burn and time are kept the same. $B_{cl}$ and time $T_{cl}$, when used with the weight, time and cost values at $P_\gamma$ for an altitude will give the optimal weight, time and cost values at $P_\beta$ for a step climb from a lower altitude.

The remaining decisions for vector minima and fix minima are the same. The initial climb computation, however, is more complicated because the climb fuel, time and distance vary considerably with the top of climb weight and it is not accurate to consider average values. Therefore, at this stage, a shortest path using a wind distance of 18,000 feet is constructed using forward search from the origin to all points in the network. There is no difference between constructing a shortest path from the origin as from a destination, except that all the distances are now computed from the origin. Thus, the shortest path from origin to any point $\beta$ is represented as $P_{O\beta,\alpha}$ where $\alpha=18000$. The shortest wind distance value from the origin is represented as $CD_\beta$.

The climb distance is computed over all altitudes for the entire network, using the fuel computed by the backward search at each point. For any outgoing vector from the origin, there will always exist a feasible climb point for any altitude if there is a feasible path using that vector from origin to destination. The optimal climb is computed by considering all the possible options among all vectors from the origin. The concept is described below and illustrated in FIG. 10:

1. For all feasible vectors $A_{\beta\gamma}$, for all the altitudes, the climb distance $d_{\beta\alpha}$ is computed using the optimal weight $FB_{\beta D, \alpha}$ for each altitude $\alpha$.

2. Let $\beta_1$ and $\beta_2$ be two consecutive fix points shown at 1002 and 1004 respectively, connected by a feasible vector $A_{\beta_1\beta_2}$. The origin O, shown at 1006, is connected to $\beta_1$ by $A_{O\beta_1}$. The weight at $\beta_1$ and $\beta_2$ at altitude $\alpha$ are $FB_{\beta_1 D,\alpha}$, shown at 1012, and $FB_{\beta_2 D,\alpha}$, shown at 1014, with $FB_{\beta_1 D,\alpha} > FB_{\beta_2 D,\alpha}$. Thus, the climb distance computed using the fuel weight at $\beta_1$ must be greater than the climb distance computed using the fuel weight at $\beta_2$. That is, $d_{\beta_1\alpha} > d_{\beta_2\alpha}$.

3. The wind distance from the origin to point $\beta_1$ is denoted by $CD_{\beta_1}$ or $d_{\beta_1 o}$, shown at 1008. Similarly, the wind distance from the origin to point $\beta_2$ is denoted by $CD_{\beta_2}$ or $d_{\beta_2 o}$, shown at 1010. The climb distance computed from the weight at $\beta_1$ is $d_{\beta_1\alpha}$. If the following relationship is true, there is a valid climb in the vector:

$$d_{\beta_1 o} < d_{\beta_1 \alpha} < d_{\beta_2 o}$$

The climb ends at a point $\beta'$. The weight $FB_{\beta' D, \alpha}$ at point $\beta'$ is used again to compute the new climb distance from this point and this method is continued until there is convergence. The climb fuel calculated is denoted as $CB_{\beta_1\alpha}$. This is added to the weight at the point $\beta_2$. The residual cruise from $\beta'$ to $\beta_2$ is added to give the takeoff weight $W_o$.

4. The above steps are carried out for all the altitudes and all feasible arcs connected to the origin O. The best climb value is then obtained by comparing all the options.

The takeoff weight $W_o$ is compared with takeoff weight limits imposed by various constraints such as ground weather and structural limits. If the weight is valid, there is a valid flight plan; otherwise, a suitable error message is sent to the user.

A dynamic flight operations environment can be established using the system and method of the present invention. The dynamic operations environment requires that the flight plan be optimized from a speed perspective. This allows a flight to arrive and depart as per the scheduled on-time constraints. There are two possibilities in this regard. One approach is to optimize the speed at every vector during the search. That is the most comprehensive approach, but it is not practical. Pilots do not want to vary the speed of the aircraft during the flight. Speed variation also needs consultation with air traffic controllers. The second approach is to perform a comprehensive tradeoff analysis on the flight plan based on altitudes and speed. A target time value $T_f$ is imposed on the flight based on the flight schedule. The objective is to satisfy the target time value within some cost constraints. The flight time $FT_o$ is compared with respect to the target time to decide whether to slow down or speed-up. A slow-down results in fuel savings while a speed-up results in additional fuel costs. Therefore, a cost constraint is imposed on the speed-up. Various additional constraints, such as gate availability, connecting flight status, and number of connecting passengers are also used to arrive at an optimal flight speed.

A business-defined variable $PPM_L$ (pound per minute) is used, which is the maximum allowable amount of fuel burn per minute of speed-up. This is a fleet specific value. If a flight is required to slow down, there are fuel savings. When it is required to speed up, a trade-off occurs between burning more fuel due to the speed-up and paying a penalty for being late with respect to the scheduled time. A planned PPM value, $PPM_{pl}$, is calculated as a ratio between the fuel burnt and the time saved. $PPM_{pl}$ is compared to $PPM_L$ and if it is lower, the speed-up is accepted.

The computation of a flight plan is dependent on a number of different restrictions on the acyclic network as well as on the minimum-cost path computation and search method described above. The most common restrictions on the network come from restricted areas imposed by NOTAMs (Notice to Airmen) and from thunderstorms, turbulence, and overwater flight constraints, among others. Each of these constraints are handled effectively by the present invention. The method of the present invention provides each flight dispatcher with a Graphical User Interface (GUI), called Restricted Area Input, consisting of a geographical map, sketching utilities and built-in libraries of NOTAM geographical areas. Dispatchers can activate various restricted areas by drawing them or selecting them from built-in libraries.

Individual dispatchers can also create their own individual restricted areas by denoting the sectors applicable on the restricted areas. Therefore, only their individual flight plan requests for those specific sectors are affected by the restricted areas. The restricted areas block out the portion of the network and the flight plan optimization avoids these areas. This provides a powerful tool to dispatchers for controlling the flight plan optimization and tailoring it to suit their individual needs. This results in a practical and feasible dynamic optimization engine for flight planning. The generation of the flight plan in this manner becomes very important in international flights, where the sources of fix points may vary widely, consisting of defined airways, air traffic imposed tracks in oceanic flights, pure lat/long based network over the non-track areas in the ocean, etc. However, as the structure of the network of fix points is completely independent of the flight plan computation method of the present invention, the method is easily adaptable to any airline flight planning system.

As indicated above, the constraints imposed on the actual search can take different forms. The dispatchers can fix a speed or altitude limit before running the optimization. These constraints override the corresponding parameters for the fleet. Such a feature may be useful in special circumstances. An important constraint is overmountain driftdown for certain two engine aircrafts (737, 757, A320). Driftdown is accomplished by evaluating the route to see if there are critical terrain areas that can impose additional safety constraints in the event of one engine failure. A digital terrain database is used for this purpose. The following is the procedure for driftdown:

1. Perform Geometric Reasoning on each vector to store a set of critical terrain points along the vector in increasing order of altitude.

2. Perform Geometric Reasoning on each vector to store a set of eligible alternates that are within some distance limits. Evaluate the terrain to each alternate and store a set of critical terrain points to the alternate in decreasing order of altitude.

Driftdown requirements may be satisfied by imposing additional weight limits on the takeoff weight $W_o$. These weight limits are imposed using the terrain data on the vector as per step 1. This results in payload restrictions, however, that can lower revenue.

A second way to satisfy driftdown requirements is to see if there are available eligible alternates along the route that can be reached from the route in the event of an engine failure. The data from step 2 is used for this purpose. This approach does not impose payload restrictions, but requires more dispatcher monitoring of alternates and is the presently preferred method. The following steps describe this method further:

1. During the flight plan calculation, the flight plan weight is used to evaluate if the alternate can be reached from any point along the vector, while clearing the terrain. The alternate weather and runway conditions must be suitable for landing the aircraft.

2. A route is divided into zones which are collections of vectors that have eligible alternates. When vectors are combined into zones, only the common alternates are considered as zone alternates. A route is feasible if it has a set of continuous zones along the areas of critical terrain.

A similar method based on geometric reasoning can be used for ETOPs, overwater driftdown, etc. The payload on a flight can be varied for performing sensitivity analysis for payload variations. There are features to perform ferry fuel computations, as well as ferrying fuel imposes additional payload constraints on the flight plan.

VI. Simulation Tool for Operations Analysis

The present invention may be used as a simulation tool for operations analysis. The simulation tool may be used to design scheduled flight times (target times) and estimate block times for airline scheduling. Block times consist of the scheduled flight time, taxi-in time, and taxi-out time. Block times are estimated seasonally for every market and are used to publish the airline schedule. An overestimation of block time leads to poor aircraft utilization while an underestimation of block time leads to poor on-time operational reliability and higher fuel costs. Most airlines have an ad hoc procedure to estimate target times and block times. The great circle route is considered for each origin and destination and an average seasonal weather data is used to generate an average flight time. This data is added to the mean values of the taxi-in and taxi-out times to get the average block times. Historical block time distributions are also used to modify the computed block time. The method of the present invention may also be used as a flight plan generation engine for a simulation tool. Historical weather information spanning three to ten years is used to generate flight plans for each day for any market. Flight plans may be generated with or without speedup/slowdown. The flight time distributions are used to select the best target time for least fuel burn. The flight time distributions are convolved with the taxi-out and taxi-in time distributions to get a block time distribution. This distribution is used to estimate the best block time. The estimated block time can be modified based on historical block time performance data.

This simulation tool enables "what-if" analysis for designing airline schedules as well as performing reliability analysis and payload analysis for the entire airline operations. The key aspect of the schedule design is to develop the flight target times $T_f$ and block time $T_b$. $T_b$ is a combination of $T_f$, taxi-out time at origin airport and taxi-in time at the destination airport. It provides the schedule time from departure to arrival. This time is used for generating airline schedules which are published for a season. $T_b$ is also used for assigning aircraft to various markets. The target time value $T_f$ is used for dynamic operations management based on the airline schedule. The following is the simulation methodology, as illustrated in FIG. 11, for generating these times:

1. Collect historical weather data 1102 for the past 6 years. Historical and current weather data is available from various vendors well-known in the industry. Current weather data can be stored and used in the future. Flight information 1104 may be obtained and stored according to the system and method of the present invention, described above.

2. Execute the algorithms described above as a flight planning engine in a simulation mode at step 1106. Simulate an entire season for all the flights using the historical weather data. Perform flight planning at the policy mach only for optimal fuel consumption. There should be no speed-up or slow-down. Store the flight times generated.

3. Develop a distribution of the flight times generated for these fuel efficient flights at step 1108. A user-specified percentile value can be used to select the $T_f$ that is most appropriate for a market by the time of day.

4. Perform a statistical convolution at step 1110 of the flight time distribution along with the historical taxi-in and taxi-out distributions obtained at steps 1112 and 1114, respectively. This will provide the block time distribution. A user-specified percentile value can be used at step 1116 to select the $T_b$ that is the most appropriate for a market by the time of day.

5. Modify various parameters to analyze reliability of the schedule. The flight departure times and payload can be varied to evaluate the reliability of the schedule.

The above simulation tool, utilizing the flight planning system and method of the present invention, provides a scientific and rational basis for selecting the flight times and schedules that are so crucial for airlines. Traditionally, these times have been merely guesses based on past history. The adoption of a rational basis for generating these times will clearly yield significant benefits in the operations of an airline.

The system and method of the present invention ensures that any modifications to the flight plan may be made within a matter of seconds, which addresses a critical performance issue of the conventional process. In addition, the resulting flight plan is designed not only to be efficient but also to be the minimum-cost flight plan available after considering the many possibilities available through use of the fix points.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

We claim:

1. A method for generating a minimum-cost airline flight plan from a point of origin through a plurality of fix points to a destination point, comprising the steps of:

storing in at least one database navigation data, including a plurality of fix points, aircraft performance data, operational flight data, a plurality of flight planning altitudes, and weather data;

constructing a two-dimensional rectangular macro region bounded by a normal to the great circle route between the point of origin and the destination point, where the normal intersects the origin, a normal to the great circle route intersecting the destination, a first horizontal bound perpendicular to said normals and located a specified distance from the great circle route, and a second horizontal bound parallel to the first bound and located an equal distance from the great circle route as the first bound;

transforming each point in the plurality of fix points from a point on a Cartesian plane to a point, expressed as an ordered pair of an x-value and a y-value, on an alternate coordinate system where the origin of the alternate coordinate system is the point of origin of the flight and the destination point of the flight is on one of the axes of the alternate coordinate system;

determining a two-dimensional feasible region within the macro region;

constructing a feasible acyclic network which includes only those arcs of a first acyclic network of the macro region which lie within said feasible region and outside of flight restricted areas; and generating a minimum-cost flight plan from the point of origin through said plurality of fix points to the destination point.

2. The method of claim 1, wherein the step of determining a two-dimensional feasible region further comprises the step of:

constructing said first acyclic network comprising a plurality of arcs in the macro region.

3. The method according to claim 2, wherein the step of determining a two-dimensional feasible region further comprises the step of determining a wind distance of each arc in the acyclic network at each altitude of the plurality of altitudes.

4. The method of claim 3, wherein the step of determining a two-dimensional feasible region further comprises the step of computing the shortest path from the point of origin to the destination point for each of the plurality of altitudes, where the cost of each arc is the wind distance of the arc at the altitude specified.

5. The method of claim 4, wherein the step of determining a two-dimensional feasible region further comprises the step of determining the point having a maximum positive y-value over all shortest path calculations at all altitudes, and the point having a minimum negative y-value over all shortest path calculations at all altitudes.

6. The method of claim 5, wherein the step of determining a two-dimensional feasible region further comprises forming a rectangular boundary for the feasible region, the boundary comprising the normal to the great circle route at the point of origin, the normal to the great circle route at the destination point, a first horizontal bound parallel to the great circle route and intersecting the point having the maximum positive y-value, and a second horizontal bound parallel to the great circle route and intersecting the point having the minimum possible y-value.

7. The method of claim 1, wherein the fix points are expressed prior to transformation as an ordered pair of latitude and longitude values.

8. The method of claim 7, wherein the step of transforming each fix point further comprises the steps of:

determining an orientation representing the angle between the point of origin of the flight and the destination point of the flight;

determining a longitudinal distance between the fix point and the point of origin of the flight;

determining a latitudinal distance between the fix point and the point of origin of the flight;

determining a transformed x-coordinate of the fix point; and determining a transformed y-coordinate of the fix point.

9. The method of claim 8, wherein a point of interception on the great circle route between the point of origin and the destination point is determined for each transformed navigation fix point by drawing a normal from the transformed fix point to said great circle route.

10. The method of claim 9, wherein the transformed navigation fix points from origin to destination are sorted in an ascending rank by sorting the intercept points in order of ascending x-coordinate value, wherein each of said intercept points is associated with one transformed navigation fix point.

11. The method of claim 10, wherein the acyclic network contains only those arcs that connect a point of lower rank to a point of higher rank.

12. The method of claim 9, wherein a first normal intersects with the point of origin, and a second normal intersects with the destination point.

13. The method of claim 1, wherein said macro region is bounded on a first side by a normal to the great circle route intersecting the point of origin and on a second side by a normal to the great circle route intersecting the destination point.

14. The method of claim 13, wherein said macro region is bounded on a third side and a fourth side by two lines parallel to and equidistant from the great circle route between the point of origin and the destination point at a predetermined distance.

15. The method of claim 1, further comprising the step of receiving flight performance data.

16. The method of claim 1, wherein the step of generating the minimum-cost flight plan from the point of origin through said plurality of fix points to the destination point further comprises the steps of:
 computing a final descent path;
 computing a cruise path; and
 computing an initial climb path.

17. The method of claim 16, wherein the step of computing the final descent path and the cruise path further comprises the steps of:
 computing backwards, starting from the destination point, the shortest wind distance path from the point of origin of the flight to the destination point of the flight, where the value of each arc is the shortest wind distance at 18000 feet;
 determining the descent distance for each flight planning altitude, where said descent distance represents the contour of points around the destination point from which the aircraft can descend;
 determining for each point on the shortest path from the point of origin to the destination point a first descent distance that is closest in value to the actual shortest wind distance and a second descent distance that is second closest in value to the actual shortest wind distance;
 storing a contour flag value for each transformed fix point in the feasible region if the shortest wind distance from a fix point to the destination point is less than the larger of the first or second descent distances but greater than or equal to the smaller of the first or second descent distances; and
 examining each fix point in the feasible acyclic network as a first fix point.

18. The method of claim 17, wherein the step of examining a first fix point comprises the steps of:
 adding to the final descent path an arc from the first fix point to a second fix point, if the arc is on the shortest wind distance path from the first fix point to the destination point at 18000 feet, and the contour flag of the first point corresponds to the lowest flight planning altitude;
 adding to the final descent path an arc from the first fix point to a second fix point, if the arc is on the shortest wind distance path from the first fix point to the destination point at 18000 feet and the altitude corresponding to the contour flag for the first fix point is greater than the lowest flight planning altitude and is also greater than the altitude corresponding to the contour flag for the second fix point;
 considering for cruise computation an arc from the first fix point to a second fix point, if the arc is not on the shortest wind distance path from the first fix point to the destination point at 18000 feet, but the altitude corresponding to the contour flag for the first fix point is greater than the lowest flight planning altitude and is also greater than the altitude corresponding to the contour flag for the second fix point; and
 considering for cruise computation an arc from the first fix point to a second fix point, if the altitude corresponding to the contour flag for the first fix point is equal to the altitude corresponding to the contour flag for the second fix point, and both of these altitude values are greater than the lowest flight planning altitude.

19. The method of claim 18, wherein the step of considering an arc from a first fix point to a second fix point for cruise computation comprises the steps of:
 finding the vector minima for each arc over all flight planning altitudes, and then finding the fix minima if the first fix point has multiple arcs emanating from it to points with a higher ordinal value;
 computing a cruise path along said single arc if the first fix point has a single arc from it to points with a higher ordinal value but said arc is not a short segment; and
 computing a cruise path along said short segment if the first fix point has a single arc from it to points with a higher ordinal value and said arc is a short segment.

20. The method of claim 19, wherein the step of computing a cruise path along a single arc comprises the steps of:
 dividing the arc into a plurality of stages;
 for each stage, storing a set of state variables, where each state variable corresponds to a flight planning altitude;
 computing at each stage a cruise cost value and a climb cost value, going backwards from the second fix point; and
 selecting the minimum of the cruise cost value and the climb cost value in order to determine whether to cruise or climb to the next stage.

21. The method according to claim 20, wherein the stages are separated by intervals of 50 nautical miles, with any remaining distance added to the stage nearest the second fix point.

22. The method of claim 20, wherein the step of computing a climb cost value comprises the following steps:
 determining the distance to the next stage at the same flight planning altitude;
 determining a step climb distance to go to the next stage and the next higher flight planning altitude;
 determining an excess cruise distance which is the difference between the step climb distance and the distance to the next stage;
 determining the nautical air miles value using the aircraft performance data and aircraft weight data;
 calculating the nautical ground miles value using the nautical air miles value, mach air speed for the arc, true air speed for the arc, and the wind value for the arc;
 calculating a step climb fuel burn value based on the aircraft performance data and aircraft weight data;
 calculating a remaining fuel burn value for cruise using the nautical ground miles value and the excess cruise distance value;
 determining a fuel burn value by adding the step climb fuel burn value to the remaining fuel burn value for cruise;
 calculating a step climb flight time value based on the aircraft performance data and the aircraft weight data;

calculating a remaining flight time value for cruise using the true air speed for the arc, the wind value for the arc, and the excess cruise distance value;

determining a flight time by adding the step climb flight time value to the remaining flight time value for cruise;

multiplying the fuel burn by a predetermined fuel cost value;

multiplying the flight time by a predetermined time cost value; and adding the product of the fuel burn and the fuel cost and the product of the flight time and the time cost to the cost value of the previous stage.

23. The method of claim 20, wherein the step of computing a cruise cost value comprises the following steps:

determining the distance to the next stage at the same flight planning altitude;

calculating the nautical ground miles value;

calculating the fuel burn;

calculating the flight time;

multiplying the fuel burn by a predetermined fuel cost value;

multiplying the flight time by a predetermined time cost value; and adding the product of the fuel burn and the fuel cost and the product of the flight time and the time cost to the cost value of the previous stage.

24. The method of claim 19, wherein the step of computing a cruise path along a short segment comprises the steps of:

for each flight planning altitude, storing a state variable;

computing a cruise cost value;

computing a climb cost value;

selecting the minimum of the cruise cost value and the climb cost value in order to determine whether to cruise or climb at the next stage and the cost value of the next stage; and storing the minimum value in the state variable.

25. The method of claim 24, wherein the step of computing a cruise cost value along a short segment comprises the steps of:

determining the distance to the second fix point at the same flight planning altitude;

calculating the nautical ground miles value;

calculating the fuel burn;

calculating the flight time;

multiplying the fuel burn by a predetermined fuel cost value;

multiplying the flight time by a predetermined time cost value; and adding the product of the fuel burn and the predetermined fuel cost value to the product of the flight time and the predetermined time cost value.

26. The method of claim 24, wherein the step of computing a climb cost value along a short segment comprises the steps of:

determining the distance to the next stage at the same flight planning altitude;

determining the step climb distance to go to the next stage and the next higher flight planning altitude;

determining an excess cruise distance which is the difference between the step climb distance and the distance to the next stage;

determining the nautical air miles value using the aircraft performance data and the aircraft weight data;

determining the nautical ground miles value using the nautical air miles value, mach air speed for the arc, true air speed for the arc, and the wind value for the arc;

calculating a step climb fuel burn value based on the aircraft performance data and the aircraft weight data;

calculating an excess fuel burn value using the nautical ground miles value and excess cruise distance;

determining a fuel burn value by subtracting the excess fuel burn value from the step climb burn value;

calculating a step climb flight time value based on the aircraft performance data and the aircraft weight data;

calculating an excess flight time value using the true air speed for the arc, the wind value for the arc, and the excess cruise distance value;

determining a flight time by subtracting the excess flight time value from the step climb flight time value;

multiplying the fuel burn by a predetermined fuel cost value;

multiplying the flight time by a predetermined time cost value; and adding the product of the fuel burn and the predetermined fuel cost value to the product of the flight time and the predetermined time cost value.

27. The method of claim 16, wherein the step of computing the initial climb path further comprises the steps of:

computing forward, starting from the point of origin, a set of shortest wind distance paths from the point of origin of the flight to each fix point in the feasible region, where the value of each arc is the shortest wind distance at 18000 feet; and computing an optimal climb path.

28. The method of claim 27, wherein the step of computing an optimal climb path comprises the steps of:

computing a set of climb distances for each flight planning altitude, from the origin to each feasible climb point, where each feasible climb point is connected to the origin by an arc in the feasible acyclic network, where said arc is used in a feasible path from the point of origin to the destination point, and the climb distances are calculated using the optimal fuel burn specified for that fix point and altitude value;

determining, for each flight planning altitude and for all first fix points in the feasible acyclic network, whether the climb distance computed using the fuel weight at each first fix point is greater than the climb distance computed using the fuel weight at a second fix point, where the first and second fix points are consecutive fix points connected by an arc in the feasible acyclic network, and the point of origin is connected to the first fix point by an arc in the feasible acyclic network;

determining, for each flight planning altitude and for all feasible arcs connected to the point of origin, whether an arc is a valid climb by determining whether a wind distance from the point of origin to each first fix point connected to it by a feasible arc is less than a climb distance computed using the fuel weight at each first fix point, and whether a wind distance from the point of origin to a second fix point is greater than said climb distance, where the first and second fix points are consecutive fix points connected by an arc in the feasible acyclic network, and the point of origin is connected to the first fix point by an arc in the feasible acyclic network;

calculating a takeoff weight for each feasible arc connected to the origin;

determining the optimal climb by determining the feasible arc connected to the point of origin that is a valid climb and that has the lowest climb distance;

determining if the takeoff weight is valid in comparison with a set of predetermined weight limits; and returning a valid flight plan if the takeoff weight is valid, or an error message if the takeoff weight is invalid.

29. The method of claim 1, further comprising the step of storing the weather data in the form of a 3-tuple of wind direction, wind value, and temperature for each altitude.

30. The method of claim 1, wherein the step of determining the feasible region further comprises the steps of:

determining the shortest path in said acyclic network from the origin to the destination at each of said set of predetermined altitudes;

for each said shortest path at each said specified altitude, determining the transformed fix point which is the largest y-value;

determining the transformed fix point with the largest y-value across all specified altitudes;

for each said shortest path at each said specified altitude, determining the transformed fix point which has the minimum y-value;

determining the transformed fix point with the minimum y-value across all specified altitudes; and forming a region bounded on a first side by the normal to the great circle route intersecting the destination, on a second side by the normal to the great circle route intersecting the origin, on a third side by a line parallel to the great circle route which intercepts the maximum y-value plus a predetermined buffer value, and a fourth side by a line parallel to the great circle route which intercepts the minimum y-value subtracted by said predetermined buffer value.

31. The method of claim 30, wherein the cost of each arc in said acyclic network at a specified altitude is the wind distance of the arc at said specified altitude.

32. The method of claim 31, wherein the wind distance of an arc from a first fix point to a second fix point at a specified altitude is determined by:

retrieving a value for ground distance of the arc from the database in the general purpose computer;

determining a mach air speed for said arc at said specified altitude;

determining a true air speed for said arc at said specified altitude; and determining the wind distance for said arc at said specified altitude.

33. A system for generating a minimum-cost airline flight plan from a point of origin through a plurality of fix points to a destination point, comprising:

a land-based general purpose computer having a memory;

at least one database stored in the memory, comprising navigation data, including a Plurality of fix points, operational flight data, a plurality of flight planning altitudes, and weather data;

means executing within the general purpose computer for determining the minimum-cost airline flight path from a point of origin through a plurality of fix points to a destination point so that the path is constructed in an acyclic network that is constructed within a feasible region that is determined within the boundaries of a two-dimensional rectangular macro region, wherein said feasible region is bounded on a first side by the normal to the great circle route intersecting the destination, on a second side by the normal to the great circle intersecting the origin, on a third side by a maximum deviation from the great circle plus a predetermined buffer value, and on a fourth side by a minimum deviation from the great circle region minus a predetermined buffer value.

34. The system of claim 33, further comprising:

means executing within the general purpose computer for transforming each point in the set of navigation fix points in the database from a point on a Cartesian plane to a point on an alternate coordinate system where the origin of the alternate coordinate system is the point of origin of the flight and the destination point of the flight in one of the axes of the alternate coordinate system, and where each transformed fix point is expressed as an ordered pair of a x-coordinate value and a y-coordinate value;

means executing within the general purpose computer for sorting the set of transformed fix points in an ascending ordinality;

means executing within the general purpose computer for constructing an acyclic network that contains all arcs that connect a transformed fix point of lower ordinality to a point of higher ordinality;

means executing within the general purpose computer for determining a shortest path in the acyclic network from the origin to the destination at each altitude in the set of predetermined altitudes;

means executing within the general purpose computer for determining for each said shortest path at each specified altitude, the transformed fix point which is the smallest y-coordinate value; and means executing within the general purpose computer for determining the transformed fix point with the smallest y-coordinate value across all specified altitudes.

35. The system of claim 34, further comprising:

means executing within the general purpose computer for determining for each said shortest path at each said specified altitude the transformed fix point which is the largest y-coordinate value; and means executing within the general purpose computer for determining the transformed fix point with the largest y-coordinate value across all specified altitudes.

36. The system of claim 33, wherein each navigation fix point in the at least one database prior to transformation is expressed as an ordered pair of latitude and longitude values.

* * * * *

UNITED STATES PATENT AND TRADEMARK OFFICE
CERTIFICATE OF CORRECTION

PATENT NO. :     6,134,500
DATED      :     October 17, 2000
INVENTOR(S):     Baoxing Tang et al.

It is certified that error appears in the above-identified patent and that said Letters Patent is hereby corrected as shown below:

In claim 33, line 6, delete "Plurality" and substitute --plurality-- in its place.

Signed and Sealed this

Twenty-second Day of May, 2001

Attest:

NICHOLAS P. GODICI

*Attesting Officer*     Acting Director of the United States Patent and Trademark Office